United States Patent
Hayasaka et al.

(10) Patent No.: US 10,134,136 B2
(45) Date of Patent: Nov. 20, 2018

(54) IMAGE PROCESSING APPARATUS AND IMAGE PROCESSING METHOD

(71) Applicant: SONY CORPORATION, Tokyo (JP)

(72) Inventors: Kengo Hayasaka, Kanagawa (JP); Katsuhisa Ito, Tokyo (JP)

(73) Assignee: SONY CORPORATION, Tokyo (JP)

( * ) Notice: Subject to any disclaimer, the term of this patent is extended or adjusted under 35 U.S.C. 154(b) by 4 days.

(21) Appl. No.: 14/427,403

(22) PCT Filed: Aug. 22, 2013

(86) PCT No.: PCT/JP2013/004965
§ 371 (c)(1),
(2) Date: Mar. 11, 2015

(87) PCT Pub. No.: WO2014/064875
PCT Pub. Date: May 1, 2014

(65) Prior Publication Data
US 2015/0248766 A1    Sep. 3, 2015

(30) Foreign Application Priority Data

Oct. 24, 2012   (JP) ................................ 2012-235121

(51) Int. Cl.
| | | |
|---|---|---|
| G06K 9/00 | (2006.01) | |
| G06T 7/00 | (2017.01) | |
| G01C 3/14 | (2006.01) | |
| G01S 11/12 | (2006.01) | |
| G01C 3/06 | (2006.01) | |

(Continued)

(52) U.S. Cl.
CPC .............. *G06T 7/0075* (2013.01); *G01C 3/06* (2013.01); *G01C 3/14* (2013.01); *G01S 11/12* (2013.01); *G06T 5/001* (2013.01); *G06T 7/593* (2017.01); *G06T 7/60* (2013.01);

(Continued)

(58) Field of Classification Search
None
See application file for complete search history.

(56) References Cited

U.S. PATENT DOCUMENTS

2010/0103175 A1* 4/2010 Okutomi ............... G06T 3/4053
345/428

FOREIGN PATENT DOCUMENTS

| JP | 2002-221405 | 8/2002 |
|---|---|---|
| JP | 2002-221405 A | 8/2002 |

(Continued)

OTHER PUBLICATIONS

Extended European Search Report for EP Patent Application No. 13848331.8, dated Jul. 12, 2016, 9 pages.

(Continued)

*Primary Examiner* — Fred Hu
(74) *Attorney, Agent, or Firm* — Chip Law Group

(57) ABSTRACT

According to an embodiment of the present technology, there is provided an image processing apparatus including a parallax information generation unit. The parallax information generation unit generates parallax information based on a first phase difference distribution and a second phase difference distribution, the first phase difference distribution being generated on a pixel by pixel basis for the first parallax image and the second parallax image, the second phase difference distribution being generated on a sub-pixel by sub-pixel basis based on the first phase difference distribution.

12 Claims, 25 Drawing Sheets

(51) Int. Cl.
   *G06T 5/00*   (2006.01)
   *G06T 7/60*   (2017.01)
   *G06T 7/593*  (2017.01)
   *H04N 13/00*  (2018.01)
(52) U.S. Cl.
   CPC .............. *G06T 2207/10012* (2013.01); *G06T 2207/20016* (2013.01); *H04N 2013/0081* (2013.01)

(56) References Cited

FOREIGN PATENT DOCUMENTS

| JP | 2002221405 A | * | 8/2002 | |
|---|---|---|---|---|
| JP | 2009-224982 | | 10/2009 | |
| JP | 2009-224982 A | | 10/2009 | |
| JP | 2009224982 A | * | 10/2009 | |
| JP | 2011-171858 | | 9/2011 | |
| WO | 2008/050904 A1 | | 2/2008 | |
| WO | 2008/050904 A1 | | 5/2008 | |
| WO | WO 2008050904 A1 | * | 5/2008 | ........... G06T 3/4053 |

OTHER PUBLICATIONS

Manap, et al., "Disparity Refinement Based on Depth Image Layers Separation for Stereo Matching Algorithms", Journal of Telecommunication, Electronic and Computer Engineering, vol. 4, No. 1, Jan.-Jun. 2012, pp. 51-64.

Changming Sun, "Fast Stereo Matching Using Rectangular Subregioning and 3D Maximum-Surface Techniques", International Journal of Computer Vision, vol. 47, No. 1, Apr. 2002, pp. 99-117.

Scharstein, et al., "A Taxonomy and Evaluation of Dense Two-Frame Stereo Correspondence Algorithms", International Journal of Computer Vision, vol. 47, No. 1, Apr. 2002, pp. 07-42.

Shimizu, et al., "Sub-Pixel Estimation Error Cancellation on Area-Based Matching" International Journal of Computer Vision, vol. 63, No. 3, Jul. 2005, pp. 207-224.

Sung, et al., "Stereo Matching Using Multi-directional Dynamic Programming", IEEE International Conference on Image Processing, 2007, pp. I-233-I-236.

Donate, et al., "Efficient and Accurate Subpixel Path Based Stereo Matching", 19th International Conference on Pattern Recognition, 2008, 4 pages.

Office Action for CN Patent Application No. 201380048338.8, dated Jun. 12, 2017, 10 pages of Office Action and 14 pages of English Translation.

Office Action for JP Patent Application No. 2014-543128, dated Nov. 7, 2017, 04 pages of Office Action and 03 pages of English Translation.

Office Action for EP Patent Application No. 13848331.8, dated Aug. 6, 2018, 05 pages of Office Action.

* cited by examiner

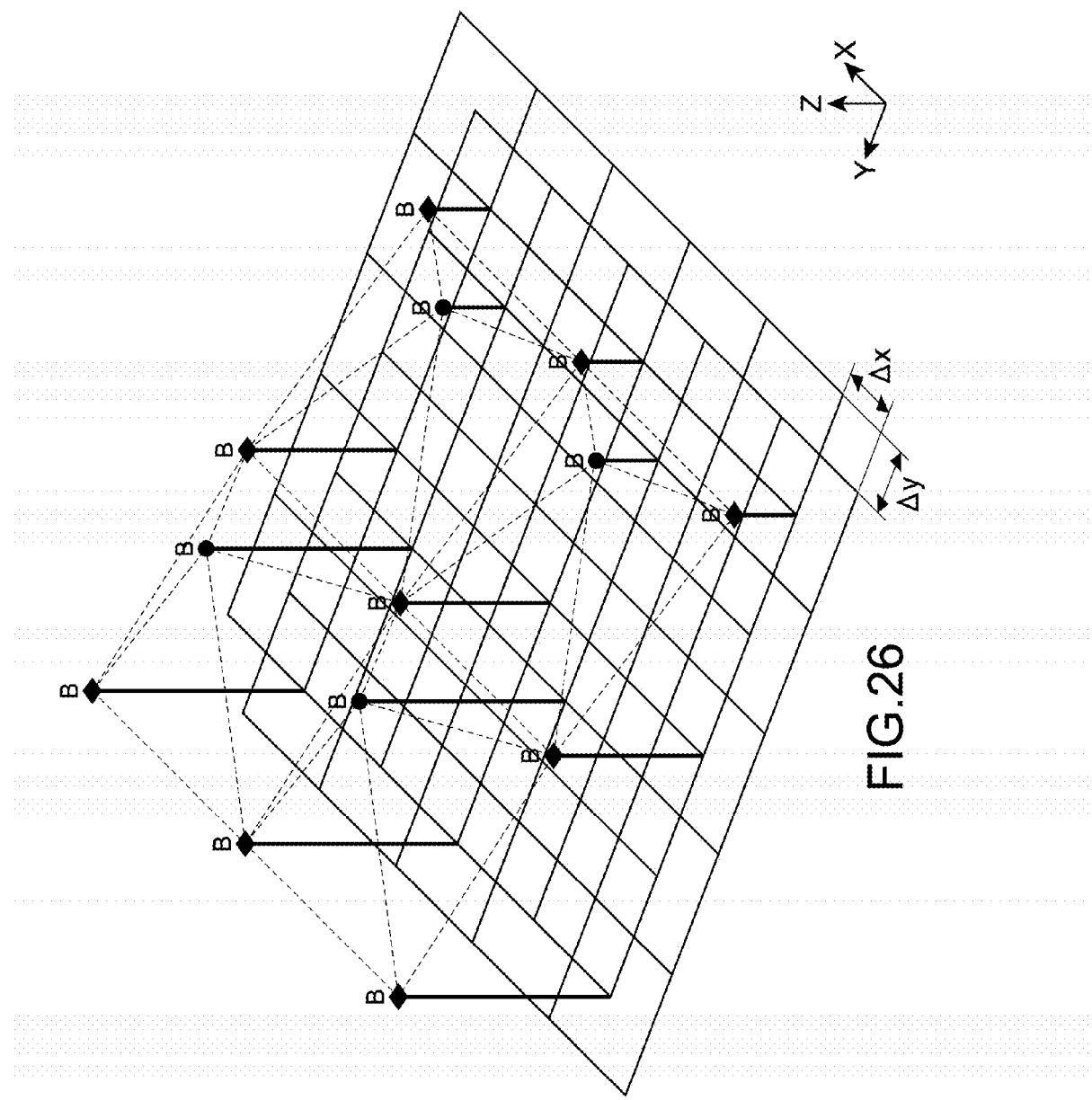

IMAGE PROCESSING APPARATUS AND IMAGE PROCESSING METHOD

TECHNICAL FIELD

The present technology relates to an image processing apparatus and an image processing method that are capable of acquiring distance information of a measured object.

BACKGROUND ART

A technology to measure a distance to a measured object by using a plurality of images having different viewpoints is known. For example, Patent Document 1 below discloses a distance calculation method using a technique called stereo matching.

In such a stereo matching technique, in the case where a distance is calculated from a plurality of parallax images along a horizontal direction (H direction) or a vertical direction (V direction) in the images, a phase difference between the parallax images is obtained. In processing of obtaining a phase difference, a local area (unit area) of a comparison target is sequentially moved in a horizontal direction, and a displacement (pixel displacement, disparity) between the parallax images in the unit areas, which have the highest correlation in a comparison range, is obtained as a phase difference. A distance can also be calculated from a plurality of parallax images along an arbitrary angle direction in the images.

Patent Document 1: Japanese Patent Application Laid-open No. 2011-171858

SUMMARY OF INVENTION

Problem to be Solved by the Invention

In the stereo matching, a distance between an object and a camera depends on the measurement accuracy of a phase difference between parallax images. Specifically, there is a problem that as a distance between an object and a camera becomes longer, the measurement accuracy of a phase difference is reduced more due to influences of camera noise, disturbance, and the like, and with this, a distance calculation accuracy is also reduced.

In view of the circumstances as described above, it is an object of the present technology to provide an image processing apparatus and an image processing method that are capable of increasing a distance calculation accuracy.

Means for Solving the Problem

To achieve the object described above, according to an embodiment of the present technology, there is provided an image processing apparatus including a parallax information generation unit.

The parallax information generation unit generates parallax information based on a first phase difference distribution and a second phase difference distribution, the first phase difference distribution being generated on a pixel by pixel basis for a first parallax image and a second parallax image, the second phase difference distribution being generated on a sub-pixel by sub-pixel basis based on the first phase difference distribution.

In the image processing apparatus, the parallax information is generated based on the first phase difference distribution generated on a pixel by pixel basis and the second phase difference distribution generated on a sub-pixel by sub-pixel basis using the first phase difference distribution. So, it is possible to acquire parallax information that is more robust to disturbance such as camera noise and is highly accurate.

Here, a sub-pixel is sometimes used to refer to a color pixel, but in this specification, it refers to a pixel unit that is smaller than one pixel. So, when each color pixel is assumed as one pixel, the sub-pixel refers to a pixel unit that is smaller than one pixel.

The image processing apparatus may further include a phase difference calculation unit to generate the second phase difference distribution based on the first phase difference distribution.

The phase difference calculation unit may generate the second phase difference distribution by correcting the first phase difference distribution with edge information detected from the first phase difference distribution.

Since a luminance difference is large near the edge portion, the estimation of the phase difference on a sub-pixel by sub-pixel basis is easily performed.

In this case, the second phase difference distribution may be generated by performing matching processing on a local luminance distribution of an edge portion calculated for the first parallax image and a local luminance distribution of an edge portion calculated for the second parallax image.

With this, the phase difference on a sub-pixel by sub-pixel basis can be detected with a high accuracy.

On the other hand, the phase difference calculation unit may generate the second phase difference distribution by calculating a correlation value between a luminance distribution in a first pixel group and a luminance distribution in a second pixel group, the first pixel group forming the first parallax image, the second pixel group forming the second parallax image and corresponding to the first pixel group.

By such a method as well, the phase difference on a sub-pixel by sub-pixel basis can be detected.

In this case, an evaluation function related to a luminance difference between a plurality of pixels adjacent to each other when the first pixel group and the second pixel group are superimposed on each other on a pixel by pixel basis may be used.

A length of a broken line can be used as the evaluation function, the broken line being acquired when luminance values of the plurality of pixels are connected. Alternatively, a surface area of a predetermined three-dimensional surface can be used as the evaluation function, the predetermined three-dimensional surface being acquired when luminance values of the plurality of pixels are connected.

The parallax information is typically distance information of a measured object. With this, various types of information processing based on the distance information can be executed.

The image processing apparatus may further include a control unit to generate a refocused image by using the distance information generated by the parallax information generation unit.

With this, a desired refocused image can be generated with a high accuracy.

The image processing apparatus may further include an imaging unit to acquire a plurality of parallax images having different viewpoints.

In this case, the parallax information generation unit can generate parallax information using a plurality of parallax images acquired by the imaging unit.

According to another embodiment of the present technology, there is provided an image processing method including acquiring a first parallax image and a second parallax image.

Parallax information is generated based on a first phase difference distribution and a second phase difference distribution, the first phase difference distribution being generated on a pixel by pixel basis for the first parallax image and the second parallax image, the second phase difference distribution being generated on a sub-pixel by sub-pixel basis based on the first phase difference distribution.

The first and second parallax images may be images prepared in advance or may be parallax images captured by the imaging apparatus or the like.

Effect of the Invention

As described above, according to the present technology, it is possible to acquire parallax information that is more robust to disturbance and is highly accurate.

BRIEF DESCRIPTION OF DRAWINGS

FIG. 26 is a diagram for describing the modified example of the processing procedure for generating the second phase difference distribution according to the third embodiment.

MODE(S) FOR CARRYING OUT THE INVENTION

Hereinafter, embodiments of the present technology will be described with respect to the drawings.

First Embodiment

Figure 1:
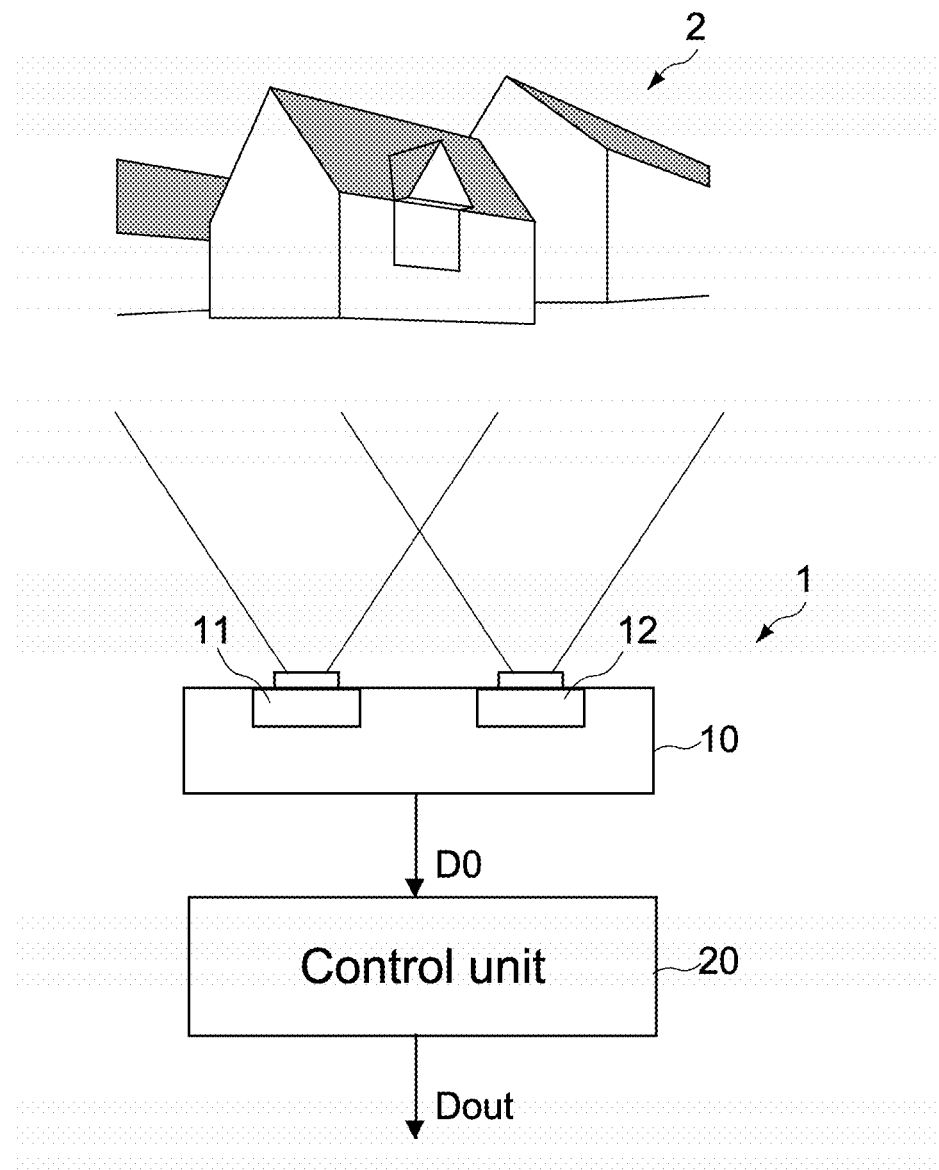
FIG. 1 is a schematic configuration diagram of an imaging apparatus according to one embodiment of the present technology.

FIG. 1 is a schematic diagram showing an overall configuration of an imaging apparatus according to one embodiment of the present technology. An imaging apparatus 1 images an imaging target (subject) 2 and performs predetermined image processing, to generate and output image data (imaging data) Dout.

[Overall Configuration]

The imaging apparatus 1 includes an imaging unit 10 and a control unit 20.

The imaging unit 10 includes two cameras 11 and 12 and is capable of acquiring a plurality of parallax images having different viewpoints by those cameras 11 and 12. The number of cameras is not limited to two, and may be three or more. The plurality of cameras are not limited to be linearly arrayed, but may be arrayed in a matrix.

The cameras 11 and 12 are each typically formed of a two-dimensional solid-state imaging device such as a CCD (Charge Coupled Device) or a CMOS (Complementary Metal-Oxide Semiconductor) in which a plurality of pixels are arrayed in horizontal and vertical directions. The cameras 11 and 12 generate imaging data D0 of the subject 2 and output the imaging data D0 to the control unit 20.

The control unit 20 has a function as an image processing unit. The control unit 20 performs predetermined image processing on the imaging data D0 acquired by the imaging unit 10, to generate image data Dout containing parallax information.

It should be noted that the image processing method in this embodiment is embodied by the control unit 20, which will also be described below. Further, an image processing program in this embodiment corresponds to one that achieves image processing functions in the control unit 20 as software. In this case, the software is formed of program groups for causing a computer to execute the image processing functions. Each program may be incorporated in advance in dedicated hardware, for example, or may be installed in a general-purpose personal computer or the like from a network or a recording medium for use.

The control unit 20 generates a first phase difference distribution on a pixel by pixel basis between the plurality of parallax images, and based on the first phase difference distribution, generates a second phase difference distribution on a sub-pixel by sub-pixel basis between the plurality of parallax images. The control unit 20 generates parallax information based on the first phase difference distribution and the second phase difference distribution.

[Control Unit]

Figure 2:
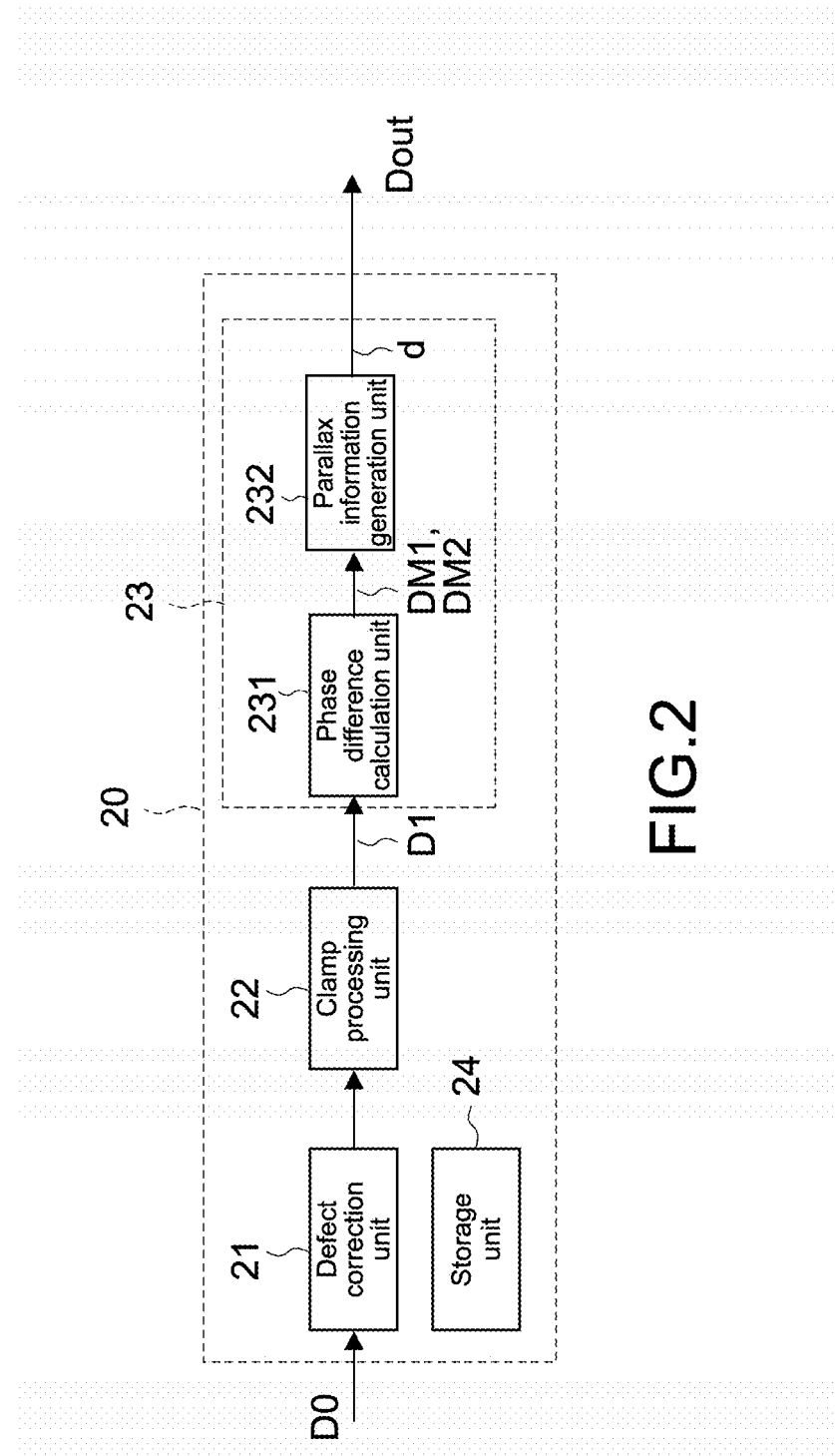
FIG. 2 is a functional block diagram showing a schematic configuration of a control unit shown in FIG. 1.

Next, a detailed configuration of the control unit 20 will be described with reference to FIG. 2. FIG. 2 shows a functional block configuration of the control unit 20. The control unit 20 includes a defect correction unit 21, a clamp processing unit 22, a distance information acquisition unit 23, and a storage unit 24.

The defect correction unit 21 corrects a defect such as a blocked-up shadow contained in the imaging data D0 (a detect resulting from abnormalities of the cameras 11 and 12).

The clamp processing unit 22 performs setting processing of a black level of each pixel data item (clamp processing) on the imaging data after the defect correction by the defect correction unit 21. It should be noted that color interpolation processing such as demosaic processing may further be performed on the imaging data after the clamp processing.

The distance information acquisition unit 23 acquires predetermined distance information based on imaging data D1 supplied from the clamp processing unit 22. The distance information acquisition unit 23 includes a phase difference calculation unit 231 and a parallax information generation unit 232.

The phase difference calculation unit 231 generates (calculates) a first phase difference distribution DM1 and a second phase difference distribution DM2 based on the imaging data D1. Specifically, the phase difference calculation unit 231 generates a first phase difference distribution DM1 on a pixel by pixel basis between a first parallax image and a second parallax image, which have different viewpoints, and generates a second phase difference distribution DM2 on a sub-pixel by sub-pixel basis between the first parallax image and the second parallax image based on the first phase difference distribution.

The parallax information generation unit 232 calculates parallax information d containing distance information based on the first and second phase difference distributions DM1 and DM2.

The storage unit 24 is formed of, for example, a ROM (Read Only Memory) or a RAM (Random Access Memory) and stores programs, calculated data, setting parameters, and the like that are necessary for computations of the respective units described above that form the control unit 20. The storage unit 24 may be provided outside the control unit 20. In this case, the storage unit 24 is controlled by the control unit 20. Further, the storage unit 24 may be formed of an external storage device such as a hard disk drive.

The control unit 20 may generate parallax information based on a first phase difference distribution and a second phase difference distribution that are prepared in advance. In this case, the first phase difference distribution and the second phase difference distribution are stored in the storage unit 24.

[Operation of Imaging Apparatus]

Subsequently, the details of the control unit 20 will be described together with the operation of the imaging apparatus 1 of this embodiment.

An image processing method in this embodiment includes the step of acquiring a first parallax image and a second parallax image, and the step of generating parallax information based on a first phase difference distribution and a second phase difference distribution, the first phase difference distribution being generated on a pixel by pixel basis for the first parallax image and the second parallax image, the second phase difference distribution being generated on a sub-pixel by sub-pixel basis based on the first phase difference distribution.

Figure 3:
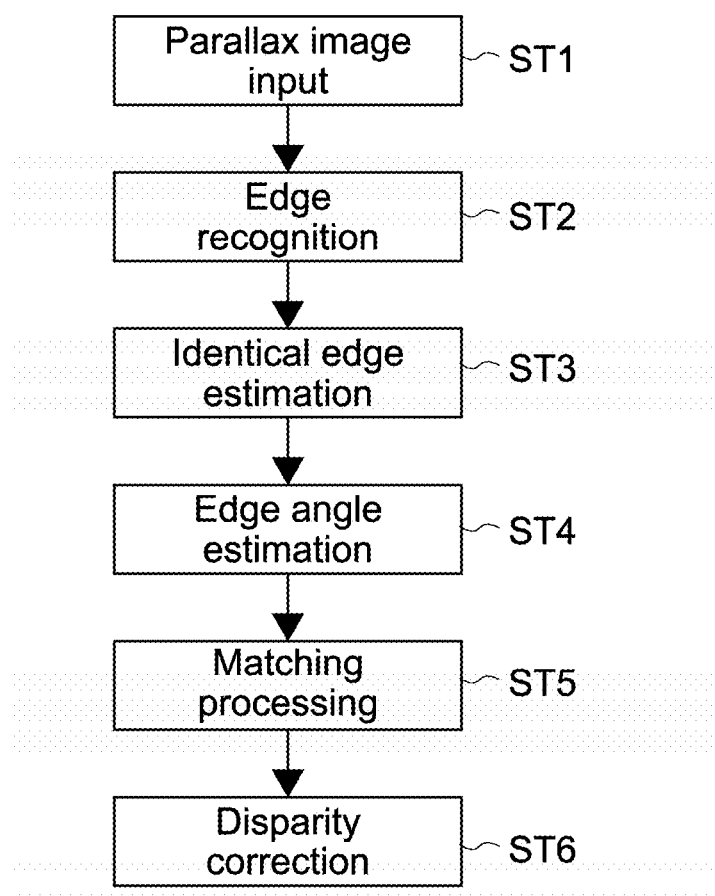
FIG. 3 is a flowchart for describing actions of the control unit.

FIG. 3 is a flowchart showing a processing procedure of the control unit 20 (phase difference calculation unit 231). The control unit 20 has a parallax image input step (Step 1), an edge recognition step (Step 2), an identical edge estimation step (Step 3), an edge angle estimation step (Step 4), a matching processing step (Step 5), and a disparity correction step (Step 6).

The camera 11 acquires a left image PL as a first parallax image, and the camera 12 acquires a right image PR as a second parallax image. The left image PL and the right image PR are acquired by imaging the identical subject 2 at the same time.

The control unit 20 receives an input of the imaging data D0 of both the parallax images of the left image PL and the right image PR from the imaging unit (Step 1). In the control unit 20, the defect correction unit 21 performs a defect correction on the imaging data D0, and then the clamp processing unit 22 performs clamp processing on the imaging data after the defect correction. Thus, the imaging data D1 after the clamp processing is input to the distance information acquisition unit 23, and first and second phase difference distributions DM1 and DM2 are generated therein.

(Generation of First Phase Difference Distribution)

The phase difference calculation unit 231 performs edge processing on those two parallax images by edge processing, color recognition, ranging on a pixel by pixel basis, and the like (Step 2).

Figure 4:
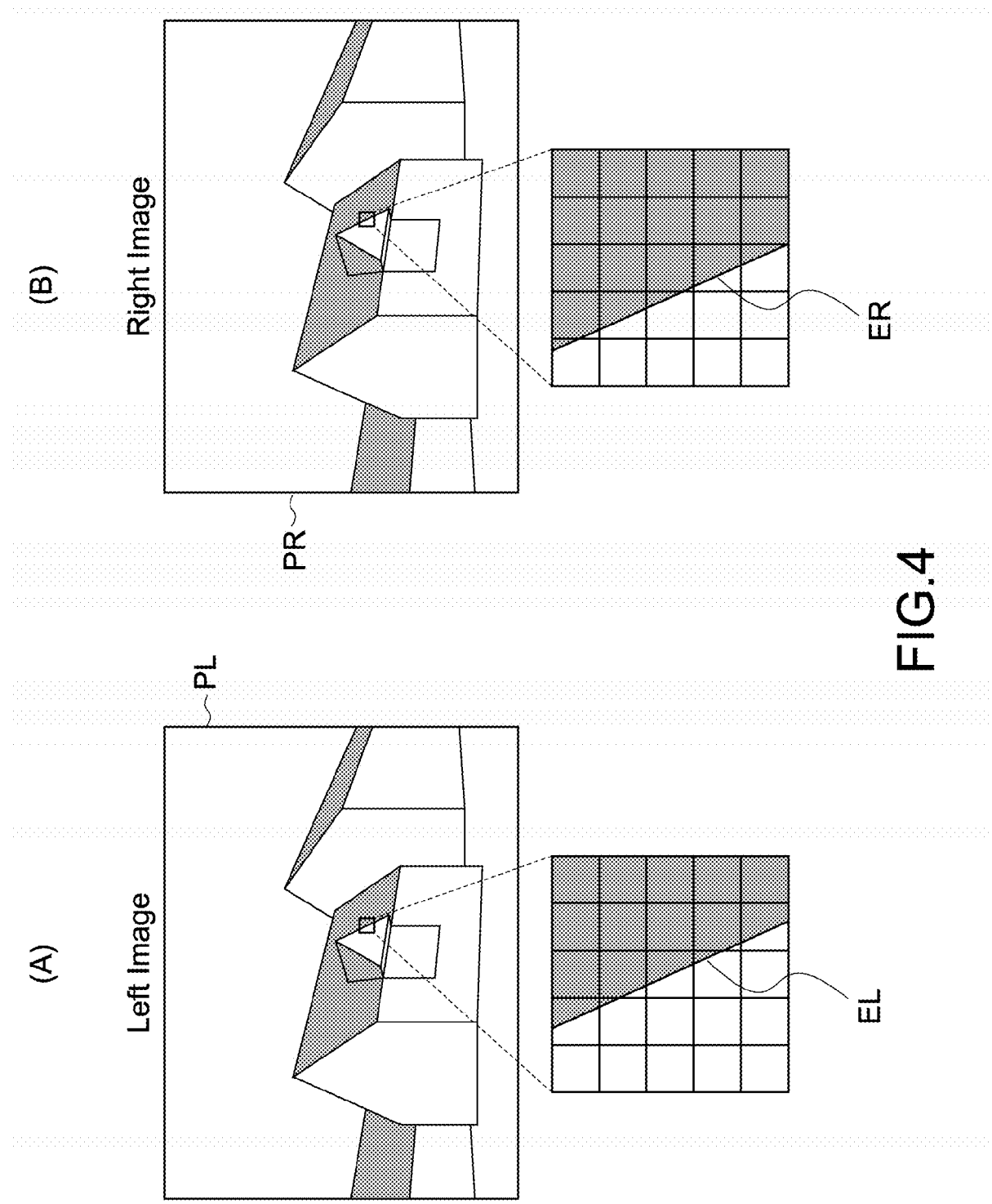
FIG. 4 is a schematic diagram showing an example of parallax images acquired in the imaging apparatus, in which (A) shows a left viewpoint image and (B) shows a right viewpoint image.

FIG. 4(A) shows a partial area of the left image PL acquired in the imaging unit 10, and FIG. 4(B) shows a partial area of the right image PR acquired in the imaging unit 10. Both of the images are obtained by imaging the identical subject (in this example, house) 2, and boundaries between brightness and darkness on the images are recognized as edge portions EL and ER.

The phase difference calculation unit 231 calculates a phase difference between the left image PL and the right image PR, to generate a first phase difference distribution on a pixel by pixel basis. Since the camera 11 and the camera 12 have different viewpoints in the horizontal direction, the edge portion EL of the left image PL and the edge portion ER of the right image PR are different from each other in positions of the pixels in the horizontal direction, and such differences correspond to a phase difference, that is, a disparity.

When a phase difference between the left image PL and the right image PR is detected, for example, the following stereo matching technique is used. This is a technique of obtaining the amount of movement of an object (a phase difference between parallax images) by sequentially comparing two parallax images in a local area (obtaining a correlation value (pixel correlation value) indicating a similarity between the images).

Figure 5:
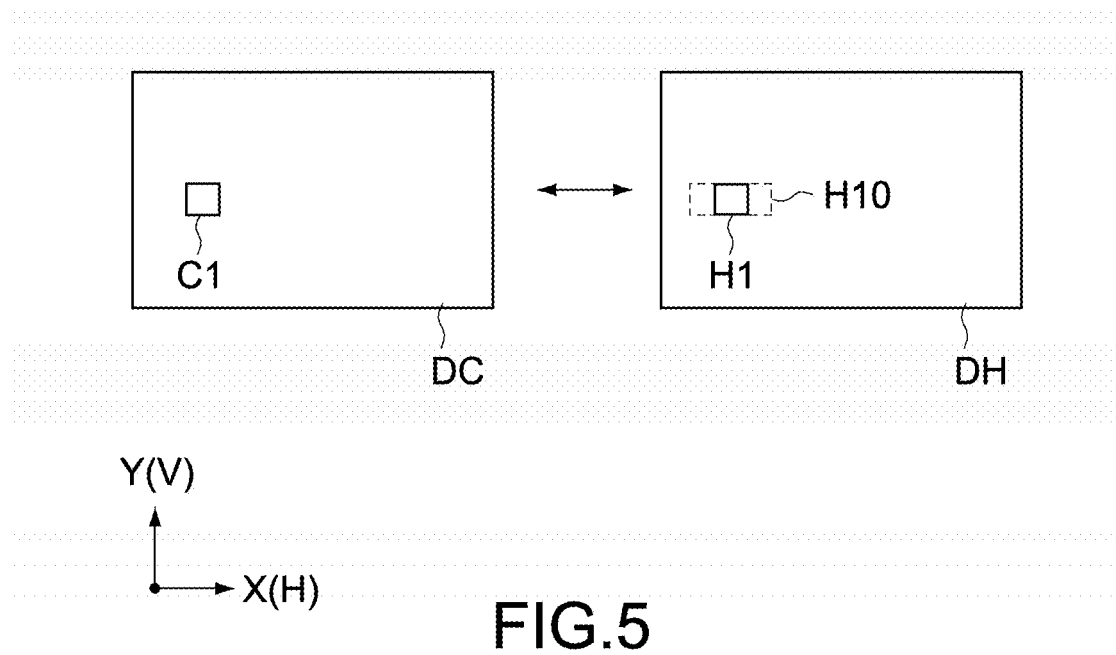
FIG. 5 is a diagram for describing a method of generating a first phase difference distribution in the control unit.

Specifically, in the case where a phase difference between two parallax images DC and DH along the horizontal direction (H direction) as shown in FIG. 5 is obtained, a phase difference distribution DM is generated as follows. First, a unit area (partial image C1 of FIG. 5: center coordinates (x1, y1)) of one parallax image DC is extracted and its position is fixed. Subsequently, a unit area (partial image H1 of FIG. 5: center coordinates (x1, y1) as a comparison target in the other parallax image DH is extracted. The position of the partial image H1 is sequentially moved in the horizontal direction within a comparison range H10, to sequentially calculate a correlation value. A displacement (pixel displacement) of the partial pixels C1 and H1 with the highest correlation within the comparison range H10 is obtained as a phase difference (Disparity). Further, such computing processing is repeatedly performed on the entire surfaces of the parallax images DC and DH while the position of the partial image C1 is changed, thus acquiring the first phase difference distribution DM1.

For the generation of the first phase difference distribution DM1, a phase difference in the vertical direction (V direction) may also be obtained. In this case as well, as described above, a unit area of one parallax image may be fixed, and a unit area of a comparison target in the other parallax image may be sequentially moved in the vertical direction within the comparison range, thus calculating a correlation value.

Various calculation methods for a correlation value may be used, but as a representative one, SAD (Sum of Absolute Difference), SSD (Sum of Squared Difference), NCC (Normalized Cross-Correlation), and the like can be used as a correlation value. In each of the SAD and the SSD, a smaller value (closer to 0) indicates a higher correlation, and a larger value (closer to ∞) indicates a lower correlation. Meanwhile, in the NCC, a value closer to 1 indicates a higher correlation, and a value closer to 0 indicates a lower correlation.

In such a manner, the first phase difference distribution DM1 on a pixel by pixel basis between the left image PL and the right image PR is generated. In this embodiment, when the first phase difference distribution DM1 is generated, the edge processing is performed on the left image PL and the right image PR. Thus, a phase difference can be easily calculated.

(Generation of Second Phase Difference Distribution)

Subsequently, the phase difference calculation unit 231 generates a second phase difference distribution DM2. In this embodiment, edge information is detected based on the first phase difference distribution DM1, and the first phase difference distribution DM1 is corrected using the edge information, to generate a second phase difference distribution DM2 (Steps 3 to 6).

The phase difference calculation unit 231 presumes that the edge portion EL and the edge portion ER are the identical target based on the first phase difference distribution DM1, and determines an area where a sub-pixel detection is performed (Step 3). Here, a 5×5 pixel area including the edge portions EL and ER is determined as a detection area as shown in (A) and (B) of FIG. 4.

In this embodiment, the phase difference calculation unit 231 performs matching processing of a local luminance distribution of the edge portion EL calculated on the first parallax image (left image PL) and a local luminance distribution of the edge portion ER calculated on the second parallax image (right image PR), to generate a second phase difference distribution (Steps 4 and 5).

Hereinafter, the details thereof will be described.

Figure 6:
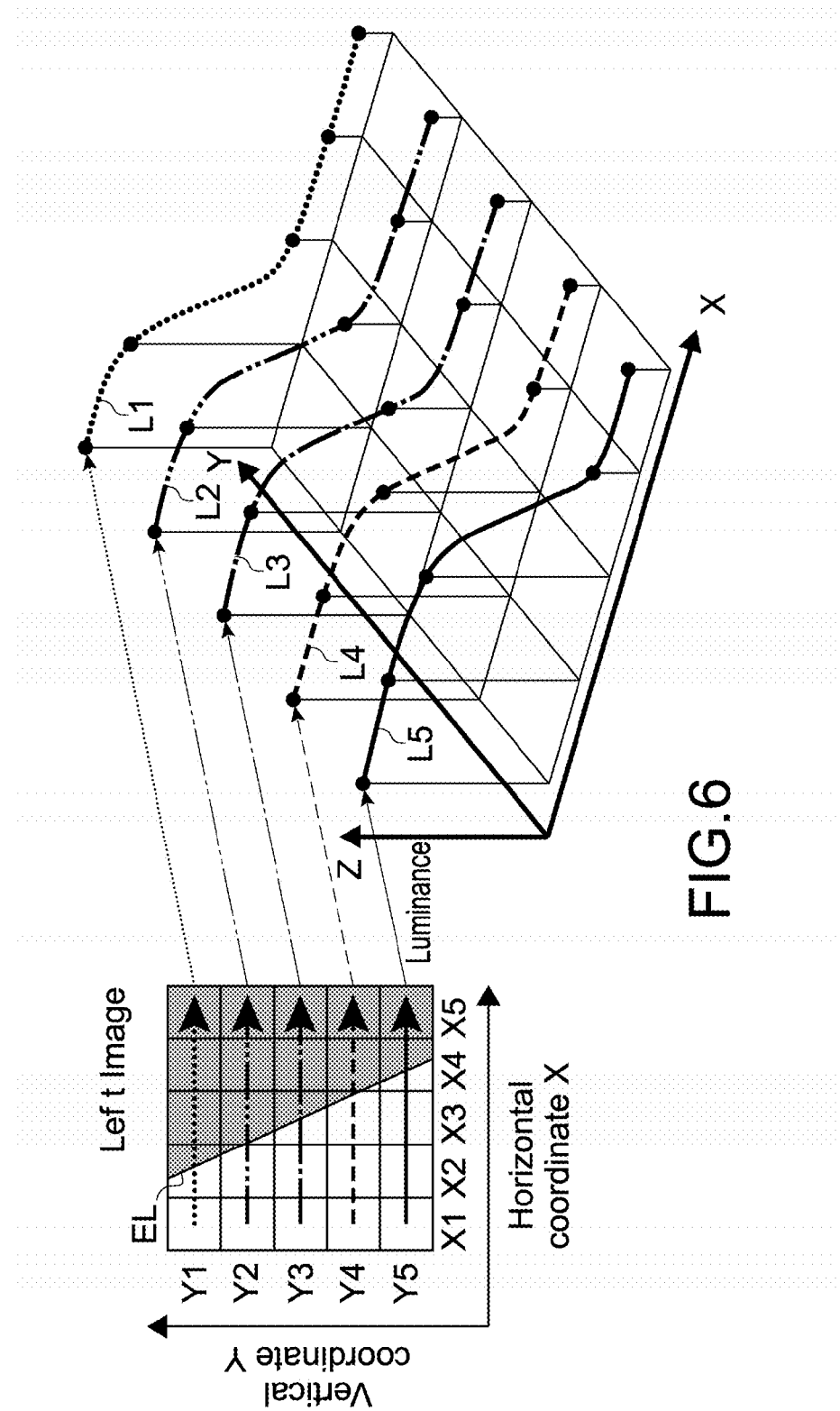
FIG. 6 is a diagram for describing a method of generating a second phase difference distribution in the control unit.

The phase difference calculation unit 231 measures a luminance of each pixel in an identical detection area of each of the left image PL and the right image PR. FIG. 6 shows a luminance distribution in the detection area of the left image PL. The horizontal coordinate represents an X axis, and the vertical coordinate represents a Y axis. The magnitude of a luminance is represented along a Z axis that is orthogonal to those axes.

Five curves L1, L2, L3, L4, and L5 shown in FIG. 6 are each an approximate curve acquired by connecting luminance values of respective pixels in the detection area on a row by row basis (Y1, Y2, Y3, Y4, or Y5), and each of the curves L1 to L5 has a luminance gradient in the edge portion EL. Since the edge portion EL goes across the pixels of the respective rows, a phase difference of the edge portion EL cannot be detected with a high accuracy on a pixel by pixel basis. In this regard, in this embodiment, a phase difference at a sub-pixel level is detected by the following processing.

First, the phase difference calculation unit 231 estimates an edge angle of the edge portion EL from the luminance distribution of the detection area described above (Step 4).

Figure 7:
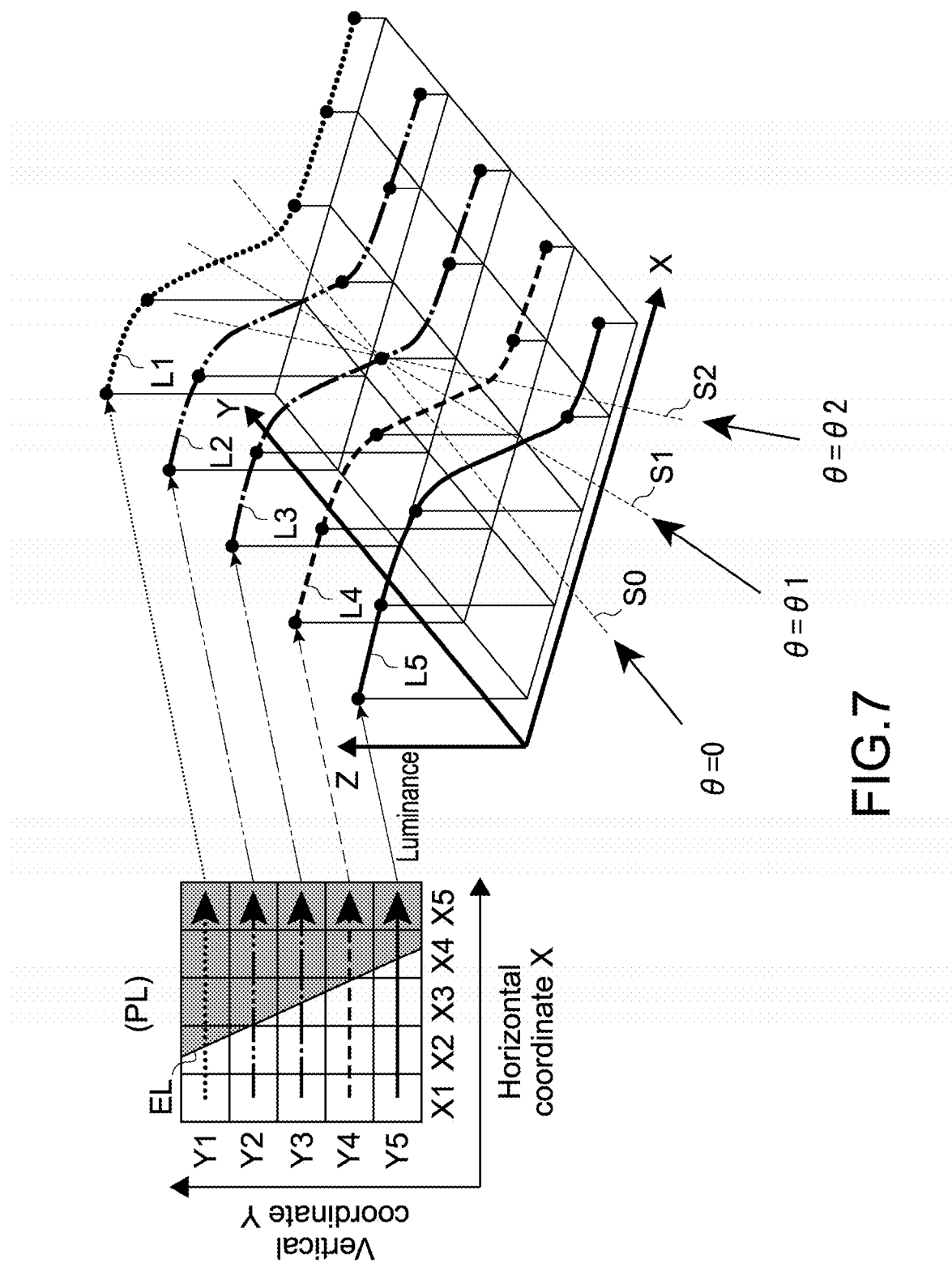
FIG. 7 is a diagram for describing a processing procedure for generating the second phase difference distribution.
Figure 8:
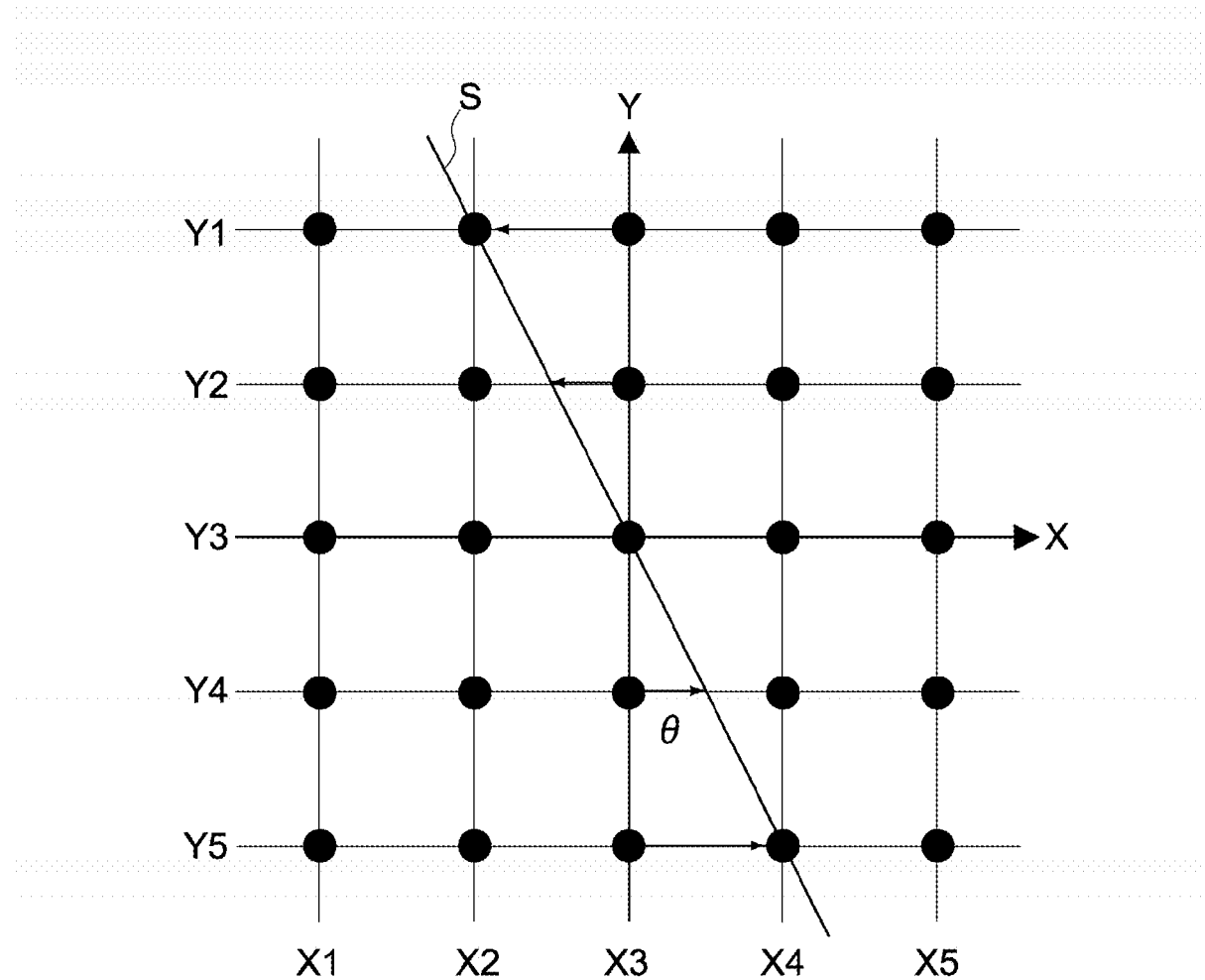
FIG. 8 is a diagram for describing how to set a sampling axis shown in FIG. 7.

In this embodiment, as shown in FIGS. 7 and 8, a sampling axis S that is orthogonal to the luminance axis (or parallel to the XY plane) is set. An angle θ formed by the sampling axis S and a reference axis (Y) parallel to the Y axis is changed, and an angel θans at which luminance values of the curves L1 to L5 virtually sampled along the axis direction of the sampling axis S coincide with (or the most approximate to) one another is estimated as an edge angle. Here, an axis passing through a pixel located at coordinates (X3, Y3) is set as the sampling axis S, but the sampling axis S is not limited thereto.

Figure 9:
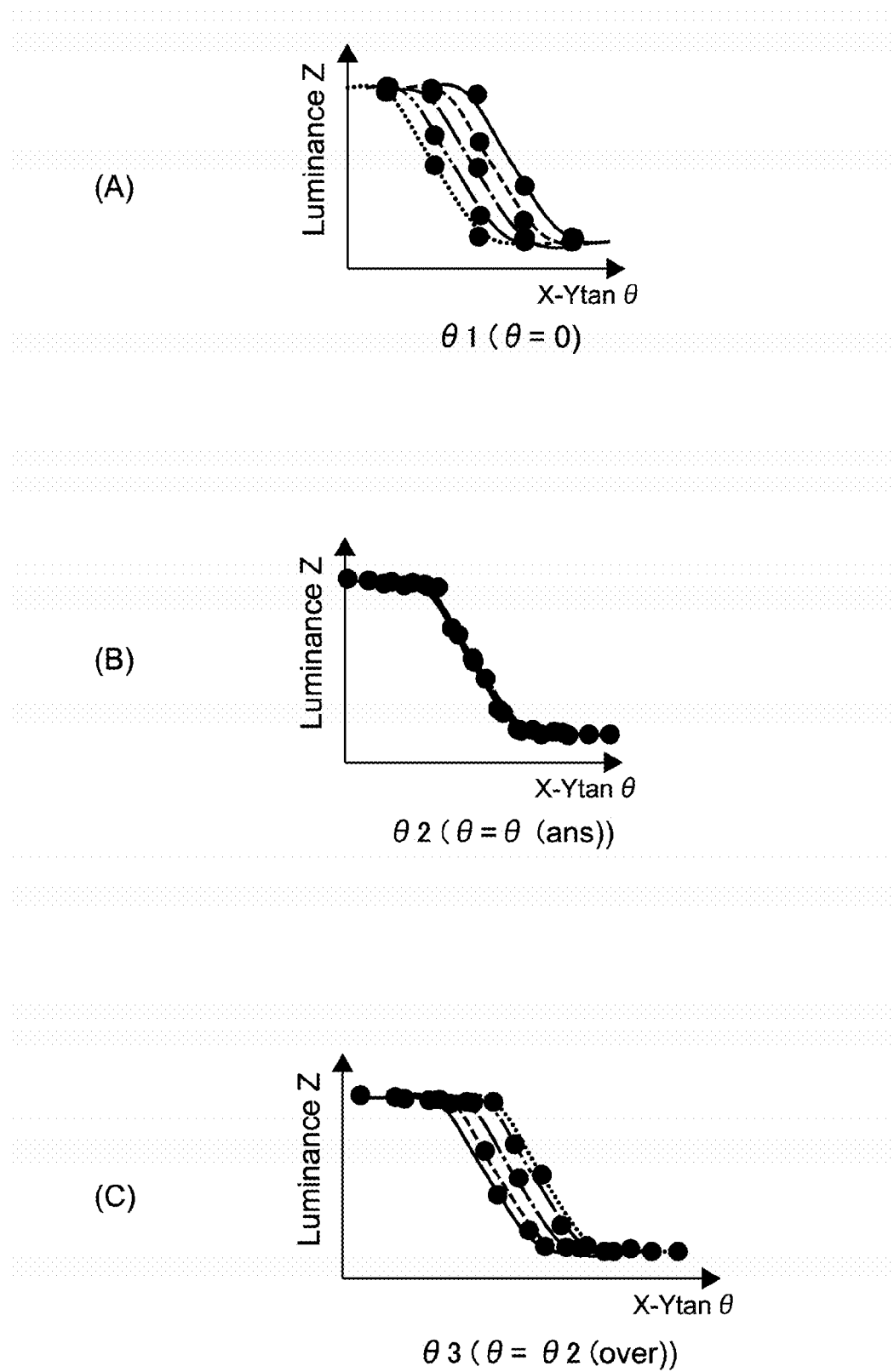
FIG. 9 is a diagram for describing a processing procedure for generating the second phase difference distribution.

FIG. 9 shows, in (A) to (C), sampling results of the curves L1 to L5 when θ=0, θ1, and θ2 (θ2>θ1). In the figure, the vertical axis represents a luminance, and the horizontal axis corresponds to a composite axis (X−Y tan θ) in which the vertical coordinate is combined with the horizontal coordinate. As a result of an evaluation, the luminance values of the curves L1 to L5 coincide with one another when θ=θ2, and the θ2 is estimated as an edge angle (θans) (FIG. 9(B)). In such a manner, a composite diagram estimated as an edge angle (θans) is hereinafter referred to as "luminance distribution for evaluation".

The estimation of the edge angle (θans) as described above is performed on each of the left image PL and the right image PR. The luminance of each spot of the luminance distribution for evaluation acquired for each of the left image PL and the right image PR is normalized by an arbitrary computing equation. Thus, the influence due to individual differences between the cameras 11 and 12 can be eliminated.

The normalized computing equation is not particularly limited, and in this embodiment, the following computing equation is used.

Luminance of left image(Left Value)=Left luminance×(Left maximum value/Left minimum value)

Luminance of right image(Right Value)=Right luminance×(Right maximum value/Right minimum value)

Figure 10:
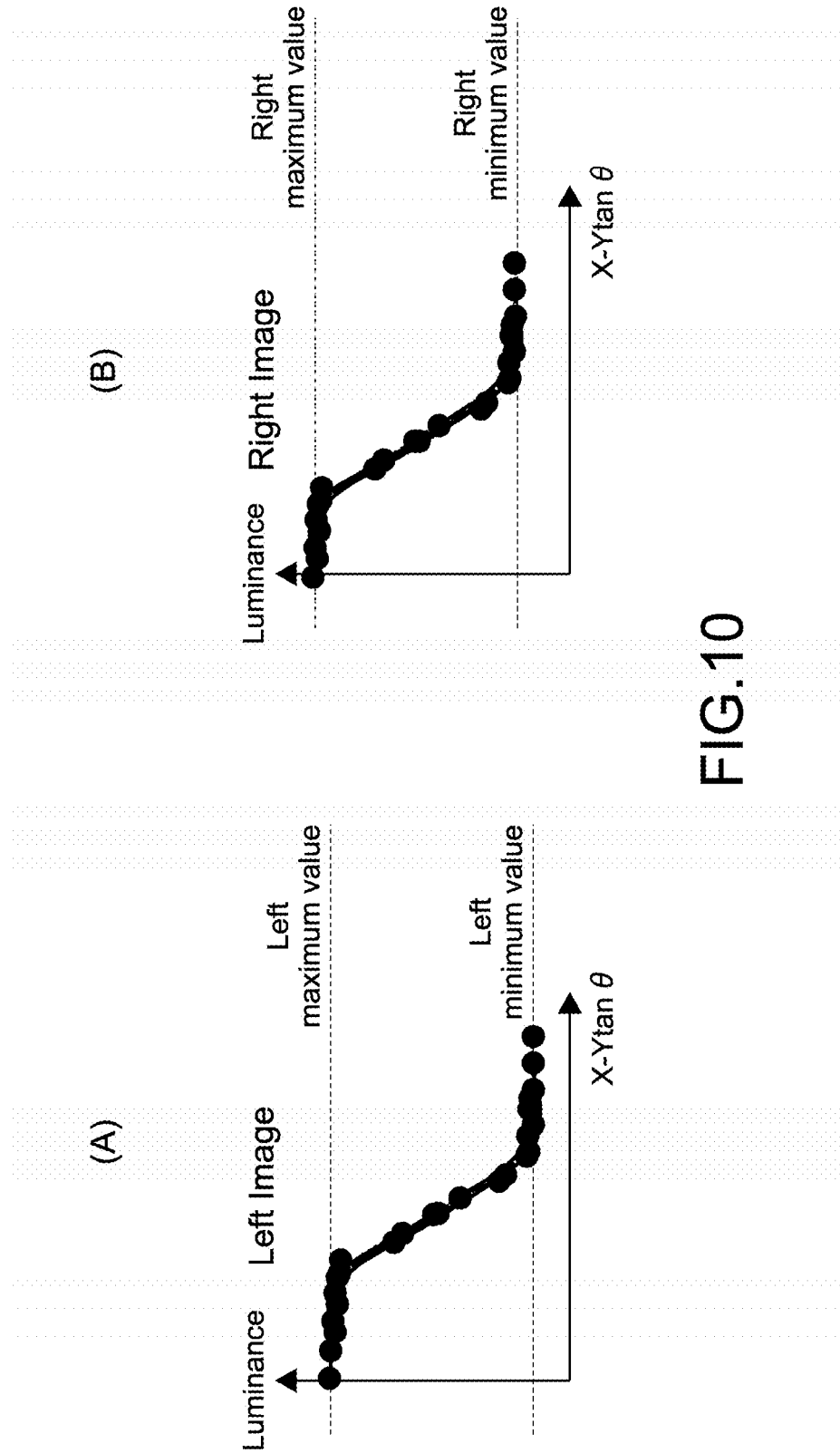
FIG. 10 is a diagram for describing a processing procedure for generating the second phase difference distribution.

Here, "Left maximum value" and "Left minimum value" correspond to the maximum value and the minimum value of luminance, respectively, in a luminance distribution for evaluation as shown in FIG. 10(A). Similarly, "Right maximum value" and "Right minimum value" correspond to the maximum value and the minimum value of luminance, respectively, in a luminance distribution for evaluation as shown in FIG. 10(B).

Next, the phase difference calculation unit 231 executes matching processing of both the left image PL and the right image PR by using the luminance distribution for evaluation of the left image PL and the luminance distribution for evaluation of the right image PR (Step 5).

Figure 11:
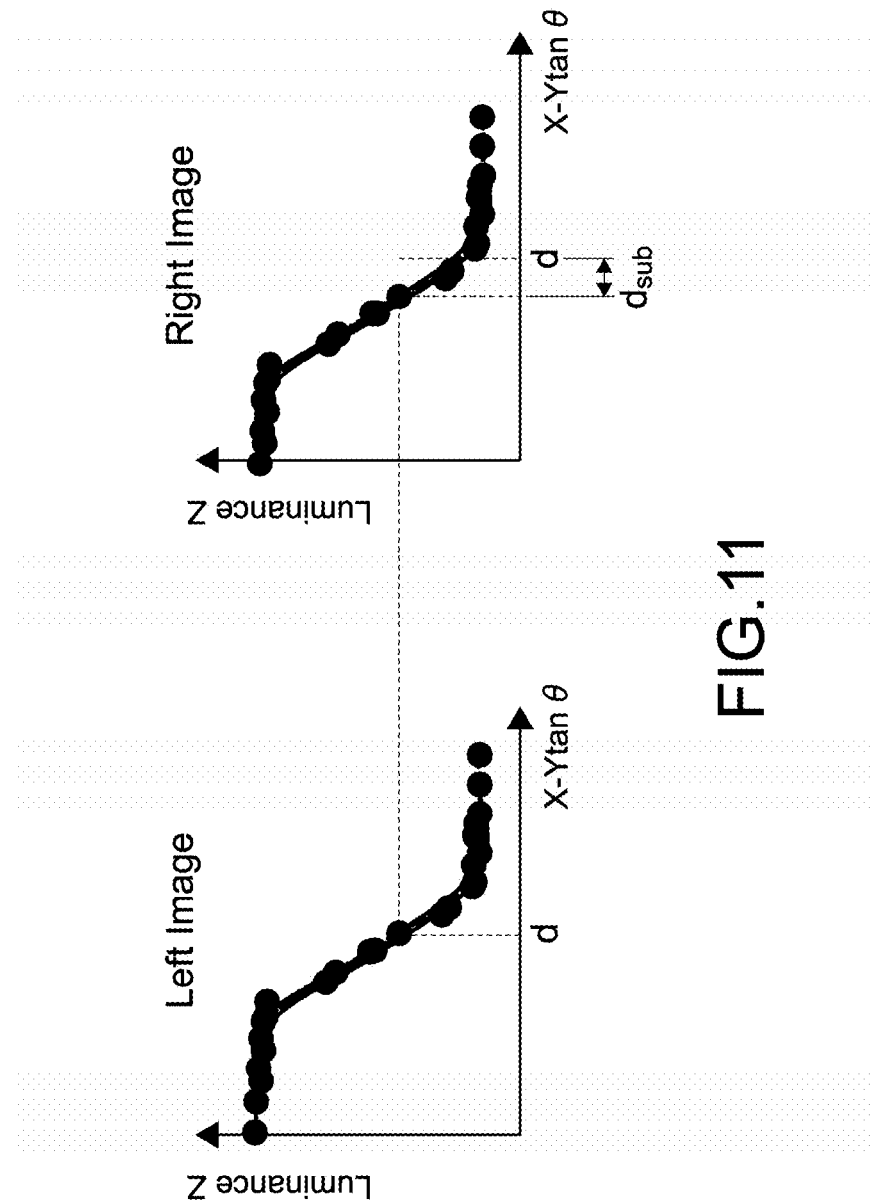
FIG. 11 is a diagram for describing a processing procedure for generating the second phase difference distribution.

FIG. 11 is an exemplary diagram showing an example of matching processing. In this example, a pixel (coordinates) d at arbitrary (X–Y tan θ) coordinates of the left image is focused on, and (X–Y tan θ) coordinates having the same luminance as the pixel (coordinates) d are searched for from the right image. In the example of FIG. 11, the (X–Y tan θ) coordinates of the right image, which have a luminance that is the same as the luminance of the pixel d of the left image, is not d but coordinates spaced away from d by "d sub". The "d sub" corresponds to a phase difference on a sub-pixel by sub-pixel basis. Such matching is executed over the entire images, and thus a phase difference distribution in the coordinate system is acquired.

When the second phase difference distribution is generated, in order to suppress the influence of noise included in camera images, fitting processing such as linear interpolation may be performed on the luminance distributions for evaluation of the respective images (on edges sampled at a high sample rate).

Subsequently, the phase difference calculation unit 231 converts the coordinate values of "d sub", which are acquired over the entire images, into the coordinate values in the original X-Y coordinate system again, and corrects the phase difference distribution (Step S6). As described above, the second phase difference distribution DM2 on a sub-pixel by sub-pixel basis is generated.

(Generation of Parallax Information)

The first and second phase difference distributions DM1 and DM2 generated in the phase difference calculation unit 231 are input to the parallax information generation unit 232. The phase difference calculation unit 231 may input a phase difference distribution, which is obtained by combining the first and second phase difference distributions DM1 and DM2, to the parallax information generation unit 232. The parallax information generation unit 232 generates parallax information d based on the first phase difference distribution DM1 and the second phase difference distribution D2.

The parallax information d contains distance information. The distance information refers to information of a distance from the cameras 11 and 12 (imaging lens) to an arbitrary reference position within a captured image corresponding to the imaging data D0. The information of the distance contains information of a distance from the cameras 11 and 12 to the reference position or a focal length on the object side of the imaging lens.

The control unit 20 is formed to be capable of outputting image data Dout containing the parallax information d to an information processing apparatus. The information processing apparatus acquires data on a distance or the like of the subject 2 based on the image data Dout, and thus can generate an image (refocused image), in which an arbitrary position of the subject 2 is focused on, for example, with a high accuracy. Further, the subject is not limited to a stationary body but may be a dynamic body that moves with respect to the imaging apparatus 1. In this case, since information on a position, a distance, a moving speed, and a moving direction of the dynamic body can be detected, the imaging apparatus 1 can be formed as an input apparatus that causes the information processing apparatus to perform predetermined processing in accordance with a movement of the dynamic body.

As described above, in this embodiment, the parallax information d is generated based on the first phase difference distribution D1 generated on a pixel by pixel basis and on the second phase difference distribution D2 generated on a sub-pixel by sub-pixel basis by using the first phase difference distribution D1. So, it is possible to acquire parallax information d that is more robust to disturbance such as camera noise and is highly accurate.

Figure 12:
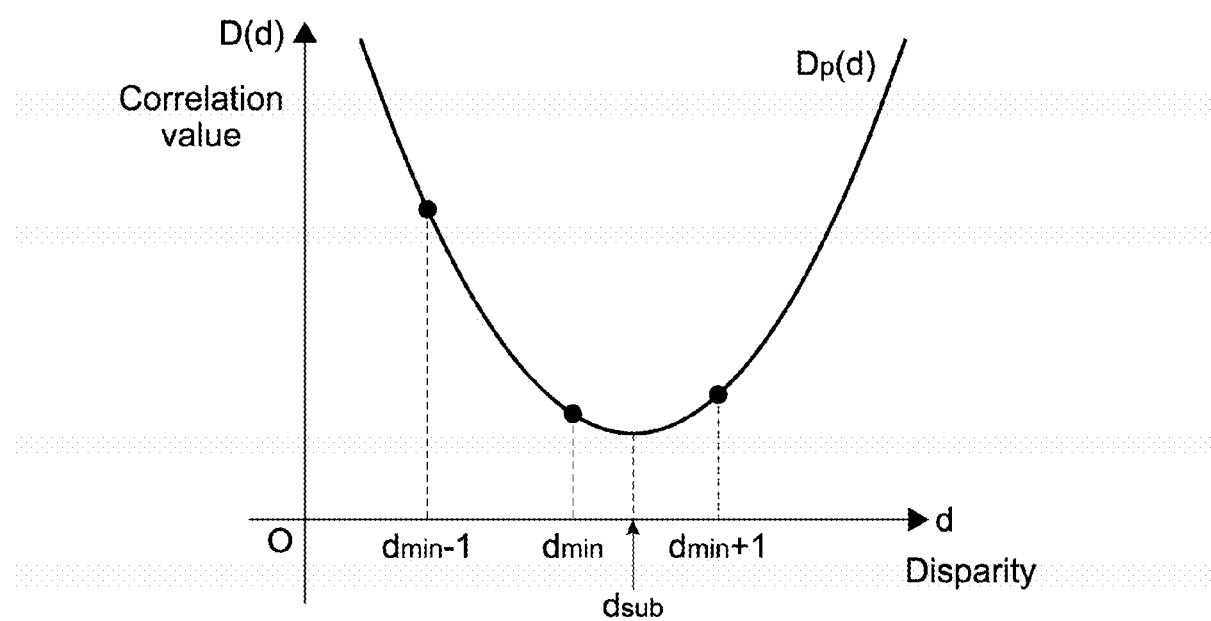
FIG. 12 is a diagram for describing a phase difference detection method in a comparative example.

For example, in a method of acquiring distance information using only a disparity on a pixel by pixel basis, as shown in FIG. 12, a disparity (d sub) having the highest correlation is estimated from a correlation value distribution acquired on a pixel by pixel basis, but the correlation value distribution largely varies due to the influence of camera noise.

In contrast thereto, in this embodiment, the phase difference on a sub-pixel by sub-pixel basis is calculated using a plurality of pixels within the detection area. This is less affected by the influence of noise, and thus it is possible to acquire distance information with a high accuracy.

Further, in this embodiment, since a plurality of pixels near the edge portions are used as the detection area, a luminance difference between pixels can be ensured and a phase difference on a sub-pixel by sub-pixel basis can be easily estimated.

Second Embodiment

Next, a second embodiment of the present technology will be described. This embodiment is different from the first embodiment described above in the method of generating the second phase difference distribution (DM2) in the control unit 20 (phase difference calculation unit 231). Hereinafter, a configuration different from that of the first embodiment will be mainly described, and a configuration similar to that of the embodiment described above will be denoted by a similar reference symbol and description thereof will be omitted or simplified.

First of all, a phase difference on a pixel by pixel basis is detected using an existing technology such as stereo matching.

Next, in all target pixels on which a parallax (phase difference) detection on a sub-pixel by sub-pixel basis is to be performed, the following processing is performed.

Specifically, the phase difference calculation unit 231 calculates a correlation value between a luminance distribution in a first pixel group, which forms a first parallax image, and a luminance distribution in a second pixel group, which forms a second parallax image and corresponds to the first pixel group, to generate a second phase difference distribution.

Figure 13:
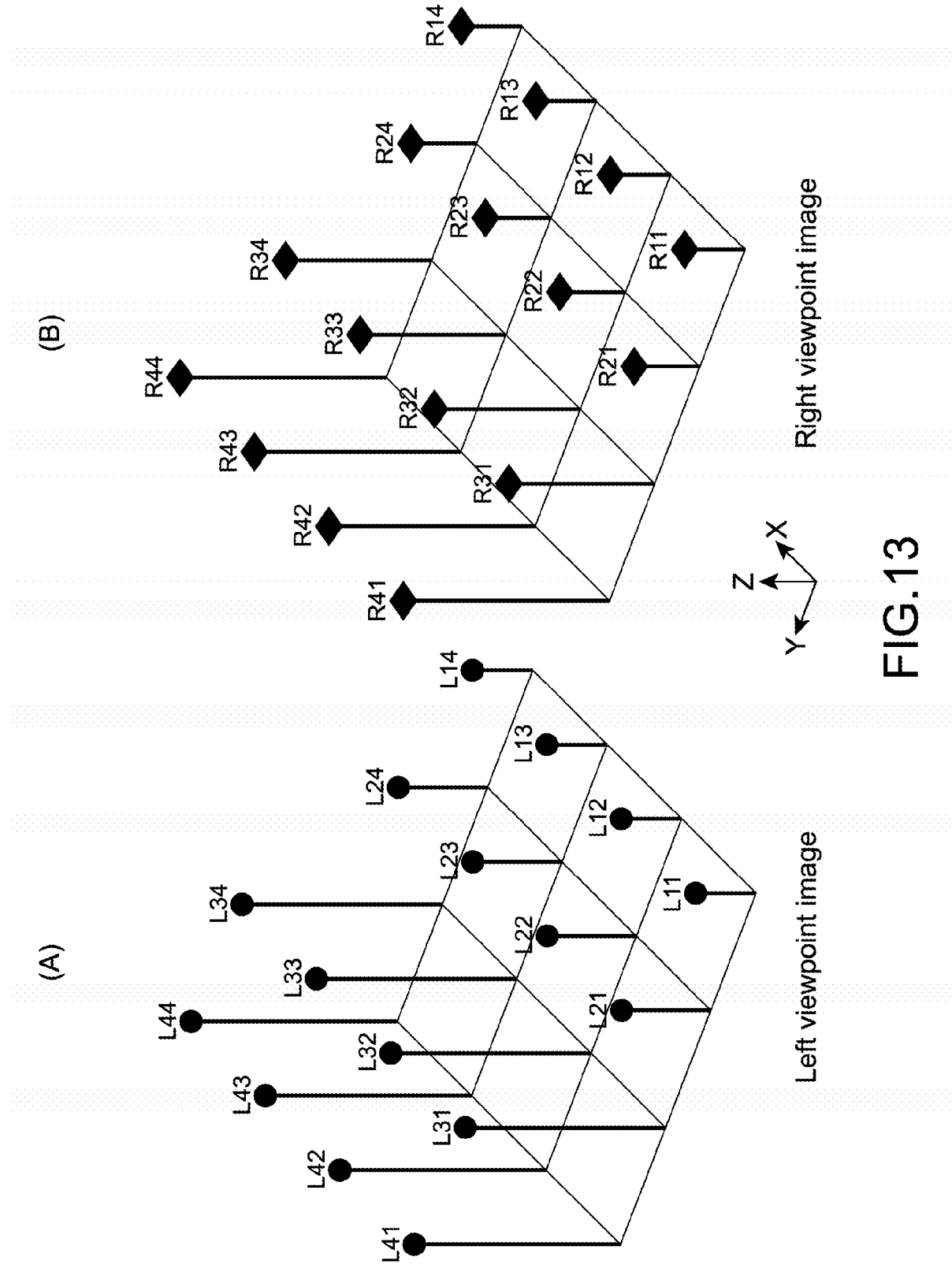
FIG. 13 is a diagram for describing a method of generating a second phase difference distribution in a second embodiment of the present technology, in which (A) shows a luminance distribution of main parts of the left viewpoint image and (B) shows a luminance distribution of main parts of the right viewpoint image.

FIG. 13 is a diagram expressing pixel luminance values of local areas in a three-dimensional structure, in which (A) indicates a luminance distribution of a pixel group of the left image, and (B) indicates a luminance distribution of a pixel group of the right image. Here, the pixel luminance values based on the edge information of the parallax image described with reference to FIG. 6 can be used. As shown in FIG. 13, in pixels R32 and L32 that are matched at one pixel level, their surrounding pixels are used as matching evaluation target data.

Figure 14:
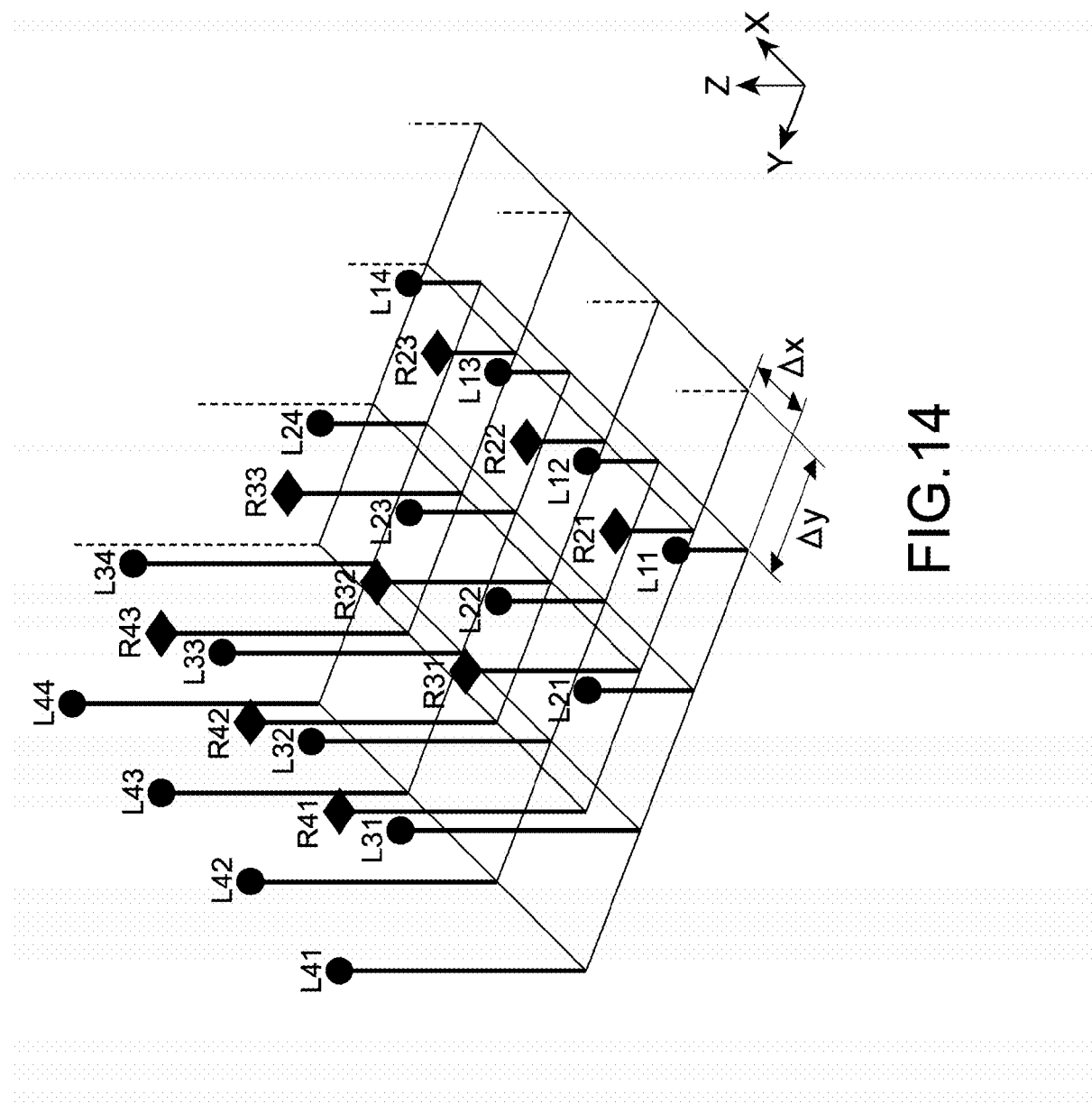
FIG. 14 is a diagram for describing a processing procedure for generating the second phase difference distribution according to the second embodiment.

FIG. 14 shows data when the pixel luminance values of the pixel group of the left image and the pixel luminance values of the pixel group of the right image are superimposed on each other on a pixel by pixel basis.

As shown in FIG. 14, assuming parallax at a sub-pixel level between the pixels R32 and L32 as Δx, Δy, used are right-viewpoint matching evaluation data (R21, R22, R23, R31, R32, R33, R41, R42, and R43) on a (2n+1)-th row and a (2n+1)-th column (n is an integer of 0 or more) centering on the pixel R32 and left-viewpoint matching evaluation data (L11, L12, L13, L14, L21, L22, L23, L24, L31, L32, L33, L34, L41, L42, L43, and L44) on a (2n)-th row and a (2n)-th column or on a 2(n+1)-th row and a 2(n+1)-th column surrounding the R32.

In the case where the value of n is set to be large, the accuracy in a parallax detection can be increased, but errors are easy to occur in a part where a difference between two parallax images is large (occlusion or the like). So, an appropriate value is set in consideration of cost for computations.

At arbitrary Δx, Δy, when an evaluation function for evaluating a matching degree at a sub-pixel level is defined as f(Δx, Δy), Δx, Δy at which f(Δx, Δy) is evaluated highest only need to be obtained. At that time, in the case where a parallax detection accuracy in one pixel is sufficiently high in a search range for Δx, Δy, the search only needs to be performed in the range of ±0.5 pixels. In the case of low performance, the search is performed in the range of ± several pixels.

The phase difference calculation unit 231 calculates the correlation value described above by using the evaluation function related to a luminance difference between a plurality of pixels adjacent to each other when the first pixel group and the second pixel group are superimposed on each other on a pixel by pixel basis. In this embodiment, the length of a broken line acquired when the luminance values of the plurality of pixels are connected is used as an evaluation function.

Figure 15:
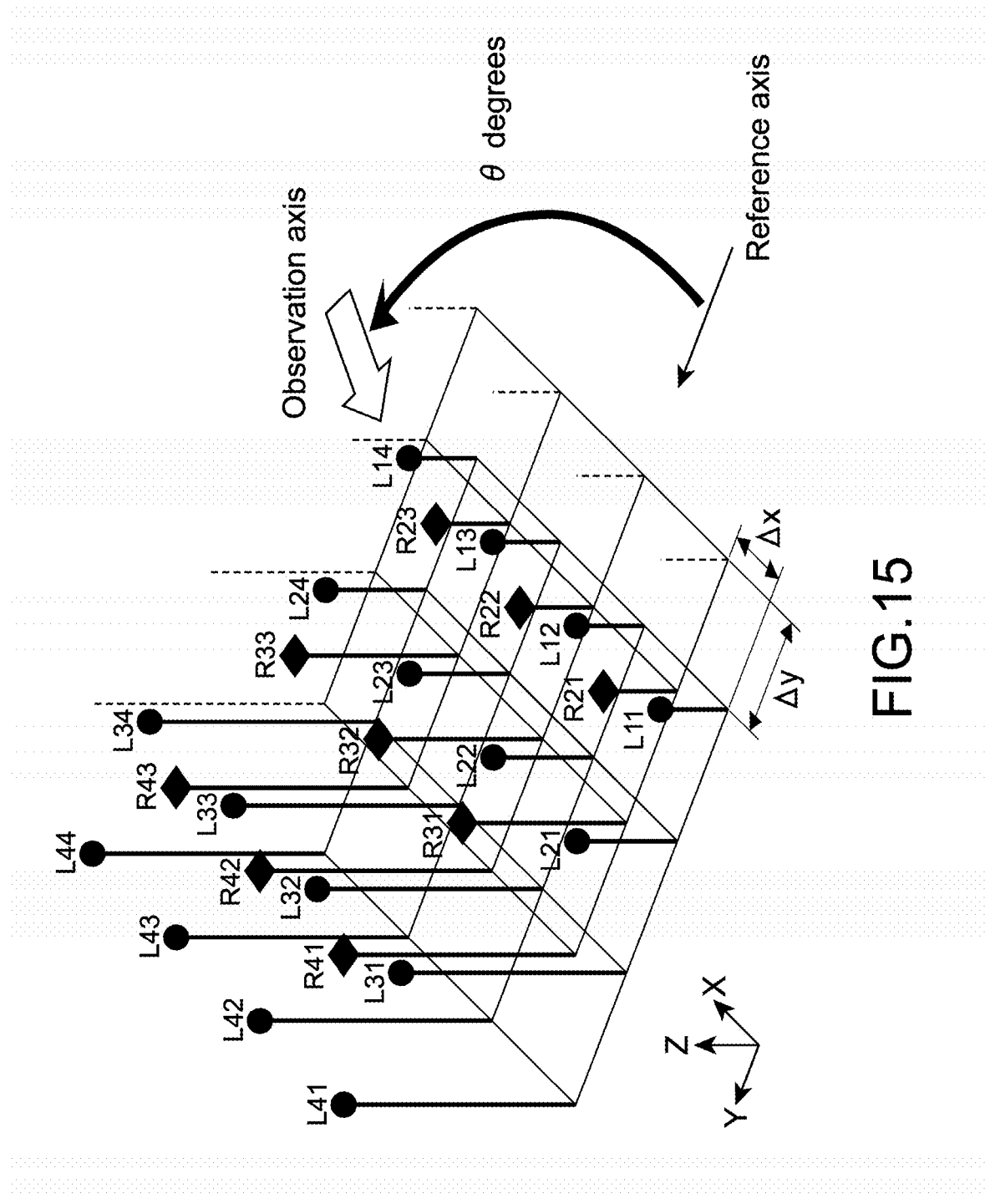
FIG. 15 is a diagram for describing a processing procedure for generating the second phase difference distribution according to the second embodiment.
Figure 16:
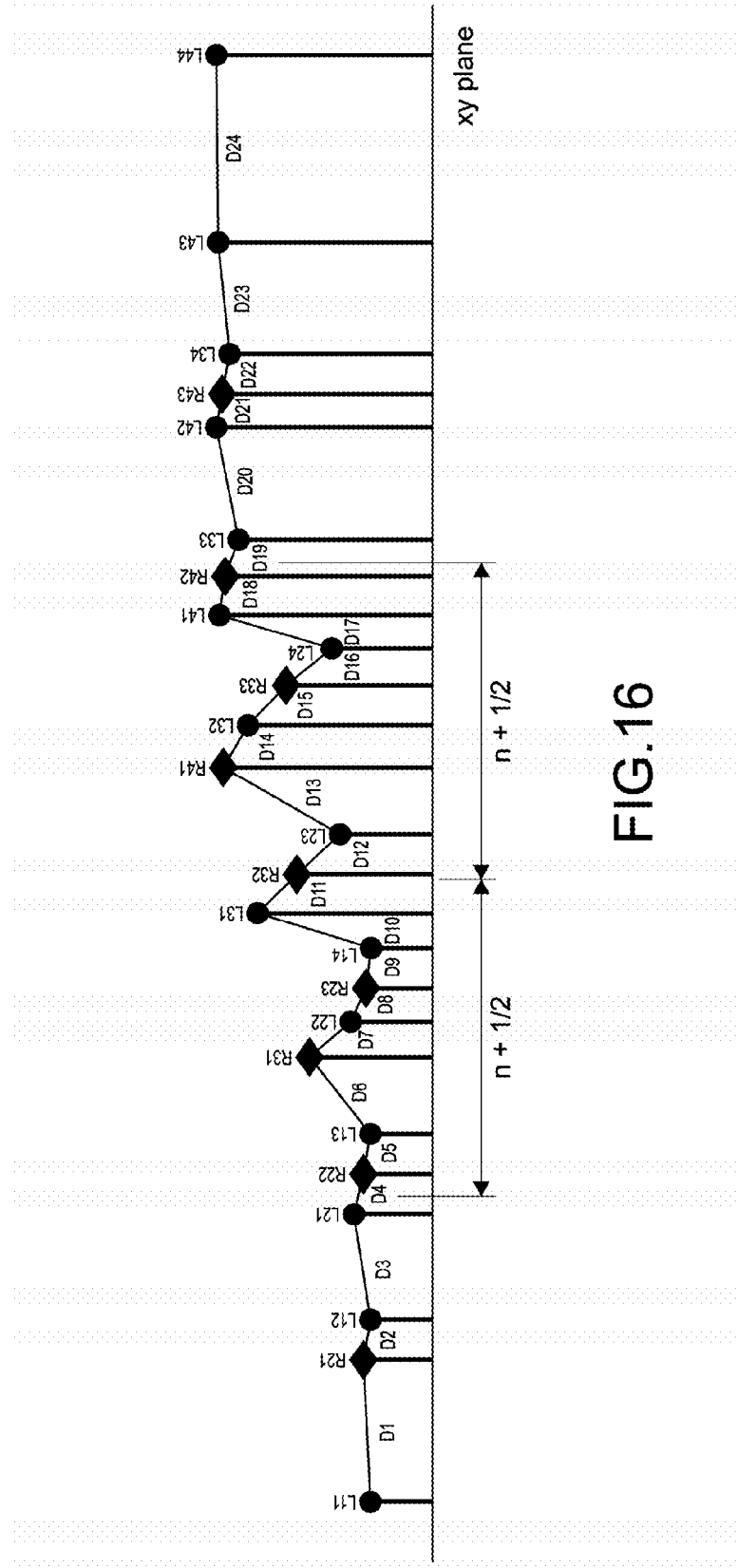
FIG. 16 is a diagram for describing a processing procedure for generating the second phase difference distribution according to the second embodiment.

As shown in FIG. 15, the matching evaluation data (R21, R22, R23, R31, R32, R33, R41, R42, R43, L11, L12, L13, L14, L21, L22, L23, L24, L31, L32, L33, L34, L41, L42, L43, and L44) at arbitrary Δx, Δy are converted into a projection image viewed at an observation axis θ, adjacent luminance values are connected with lines, and a broken-line shape as shown in FIG. 16 is generated. The observation axis θ refers to an angle formed by the reference axis parallel to the X axis (horizontal axis) and the observation axis parallel to the XY plane, but the reference axis can be arbitrarily set and is not limited to the example shown in the figure.

Figure 17:
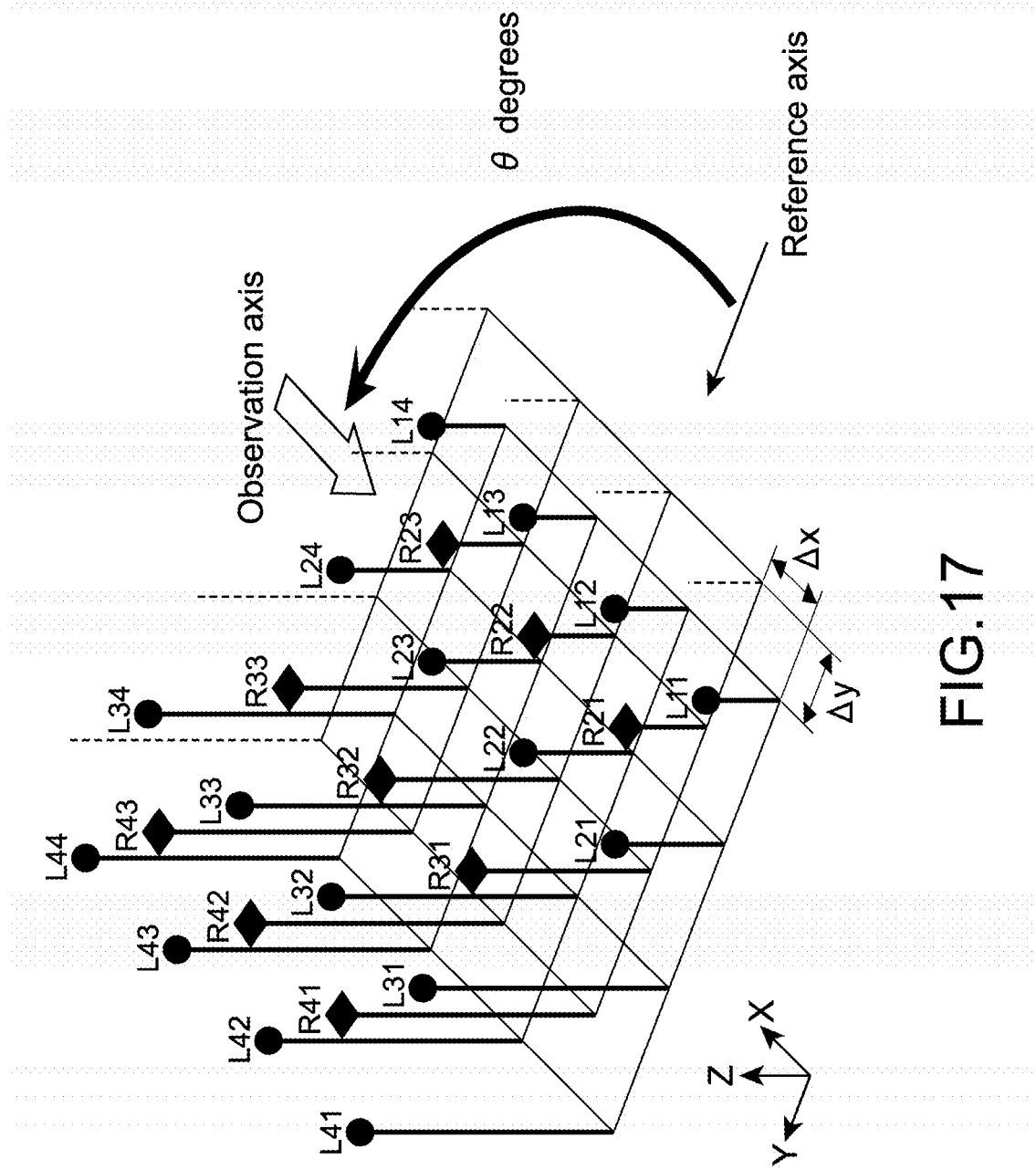
FIG. 17 is a diagram for describing a processing procedure for generating the second phase difference distribution according to the second embodiment.
Figure 18:
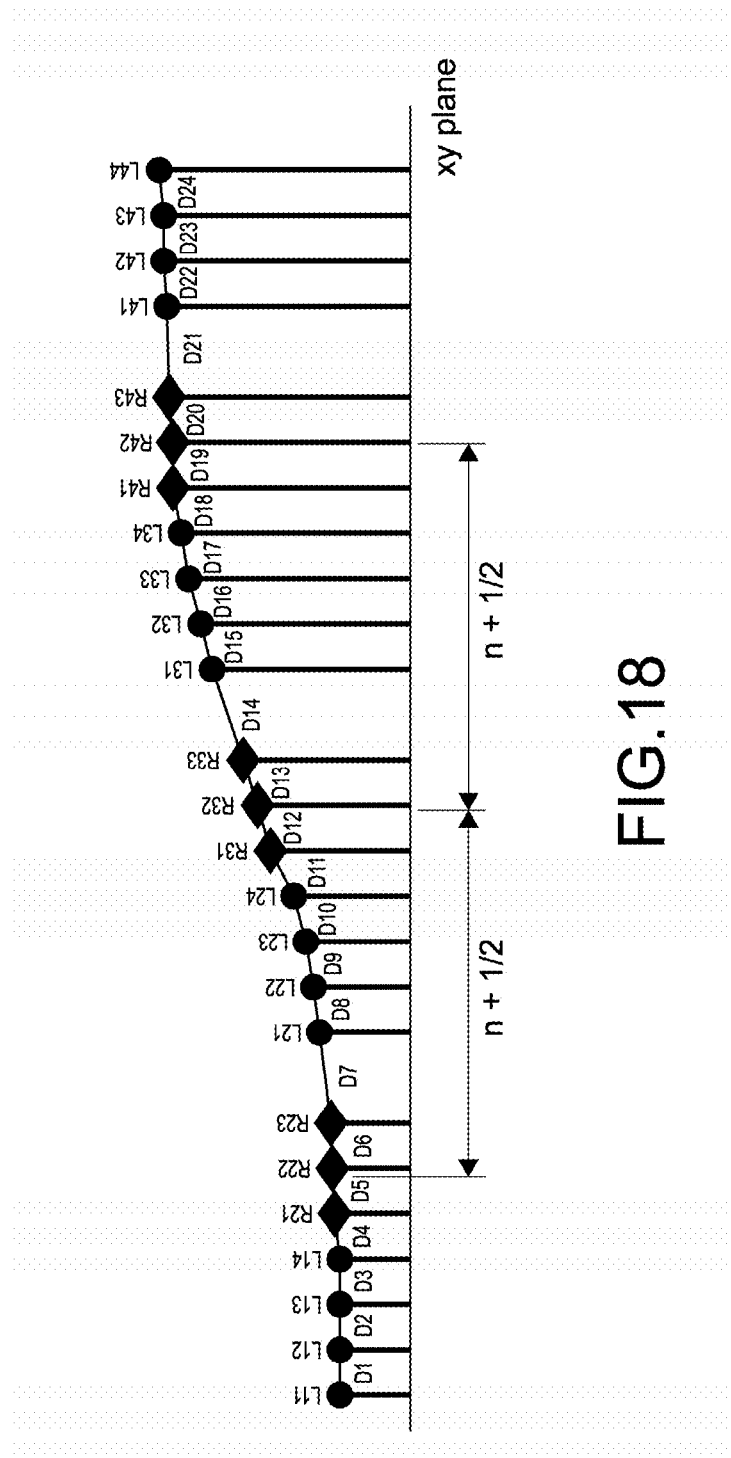
FIG. 18 is a diagram for describing a processing procedure for generating the second phase difference distribution according to the second embodiment.

When the two parallax images coincide with each other at a sub-pixel level and the observation axis θ is an appropriate angle, the broken-line shape can be expected to be smoothly connected without irregularities. So, the broken-line shape smoothly connected only needs to be evaluated. With smoothness without irregularities, the length of the broken line becomes the shortest, and thus the length of the broken-line shape only needs to be used as an evaluation function. FIGS. 17 and 18 show an example in the case where the matching at a sub-pixel level is obtained and the length becomes the shortest.

In the examples of FIGS. 15 to 18, when all the matching evaluation data (R21, R22, R23, R31, R32, R33, R41, R42, R43, L11, L12, L13, L14, L21, L22, L23, L24, L31, L32, L33, L34, L41, L42, L43, and L44) is rotated about the R32 by (−θ) degrees and depicted on the xz plane, a projection image viewed at the observation axis θ is obtained. Assuming that initial coordinates of certain evaluation data is (x+Δx, y+Δy), coordinates (xr, yr) after the rotation are obtained by the following expressions. Actually, only xr is used and thus yr is not calculated.

$$xr=(x+\Delta x)\cos(-\theta)-(y+\Delta y)\sin(-\theta)$$

$$yr=(x+\Delta x)\sin(-\theta)+(y+\Delta y)\cos(-\theta)$$

Next, a method of obtaining the length of the broken line by connecting the projected luminance values is shown. For example, assuming that x coordinates after the rotation of the L11 and the R21 are $x_{L11}$ and $x_{R21}$, the luminance values are $B_1$ and $B_2$, and the length of a line segment connecting the L11 and the R21 is D1, D1 can be expressed by the following expression.

$$D1=\sqrt{((x_{L11}-x_{R21})^2+(a(B_1-B_2))^2)}$$

In this expression, a coefficient a is used. The coefficient a is a parameter for converting a luminance into spatial distance information and affects the performance of the evaluation function. So, it is necessary to determine the value with a sufficient consideration so as to increase the performance of the evaluation function. In such a manner, the lengths of all the line segments (D1, D2, D3, ... D3, and D24) are obtained, and the length of the broken lines only in the range of a width (2n+1) centering on the R32 is calculated to be an evaluation function f(Δx, Δy).

The evaluation by the broken-line-length minimizing method is an evaluation method based on the assumption that a local area of a captured image is an aggregation of edges oriented in a certain direction. Although an area without edges is difficult to evaluate, the area without edges lacks in information for obtaining sub-pixels in the first place. So, such an area may be eliminated so as not to be considered as an evaluation target.

As described above, the second phase difference distribution on a sub-pixel by sub-pixel basis is generated. In the first embodiment, the edge angles in the left image and the right image are separately estimated, and then matching processing is performed on both the images to generate the second phase difference distribution. In this embodiment, with the right image and the left image being superimposed on each other, the second phase difference distribution based on the edge information is generated. In this embodiment as well, the same effects and actions as those of the first embodiment can be obtained.

Third Embodiment

Next, a third embodiment of the present technology will be described. This embodiment is different from the first and second embodiments described above in the method of generating the second phase difference distribution (DM2) in the control unit 20 (phase difference calculation unit 231). Hereinafter, configurations different from those of the first and second embodiments will be mainly described, and configurations similar to those of the embodiments described above will be denoted by similar reference symbols and description thereof will be omitted or simplified.

As in the second embodiment, the phase difference calculation unit 231 calculates a correlation value between a luminance distribution in a first pixel group, which forms a first parallax image, and a luminance distribution in a second pixel group, which forms a second parallax image and corresponds to the first pixel group, to generate a second phase difference distribution. The phase difference calculation unit 231 calculates the correlation value described above by using an evaluation function related to a luminance difference between a plurality of pixels adjacent to each other when the first pixel group and the second pixel group are superimposed on each other on a pixel by pixel basis. This embodiment is different from the second embodiment in that a surface area of a predetermined three-dimensional surface acquired when the luminance values of the plurality of pixels are connected is used as an evaluation function.

Figure 19:
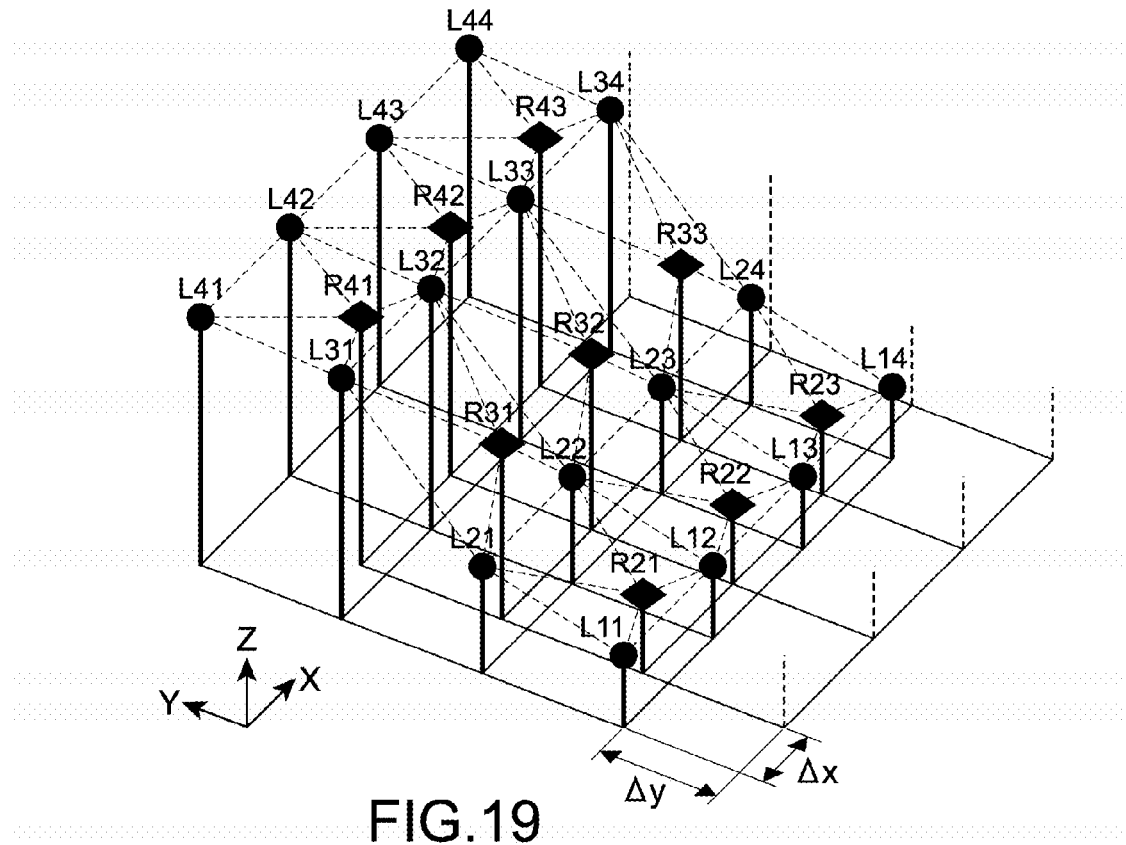
FIG. 19 is a diagram for describing a method of generating a second phase difference distribution in a third embodiment of the present technology and describing a processing procedure for generating the second phase difference distribution.
Figure 20:
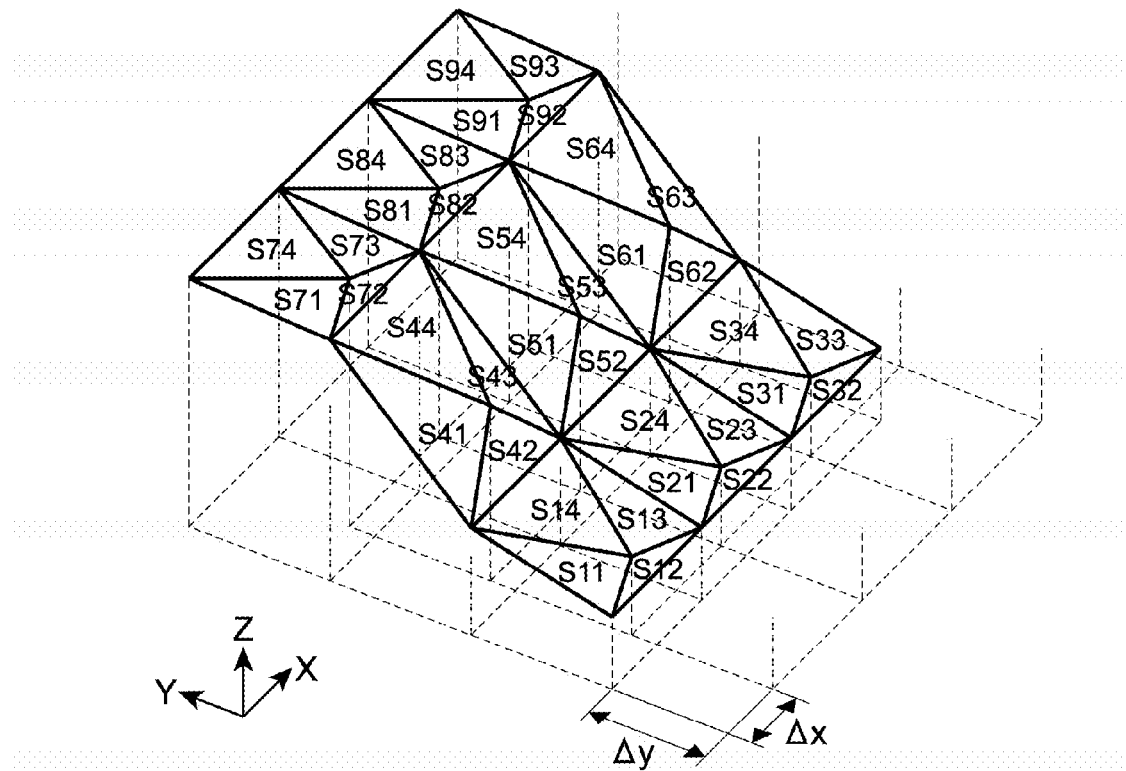
FIG. 20 is a diagram for describing a processing procedure for generating the second phase difference distribution according to the third embodiment.

As shown in FIG. 19, the matching evaluation data (R21, R22, R23, R31, R32, R33, R41, R42, R43, L11, L12, L13, L14, L21, L22, L23, L24, L31, L32, L33, L34, L41, L42, L43, and L44) at arbitrary $\Delta x$, $\Delta y$ are connected on a three-dimensional space, and a three-dimensional surface shape as shown in FIG. 20 is generated.

Figure 21:
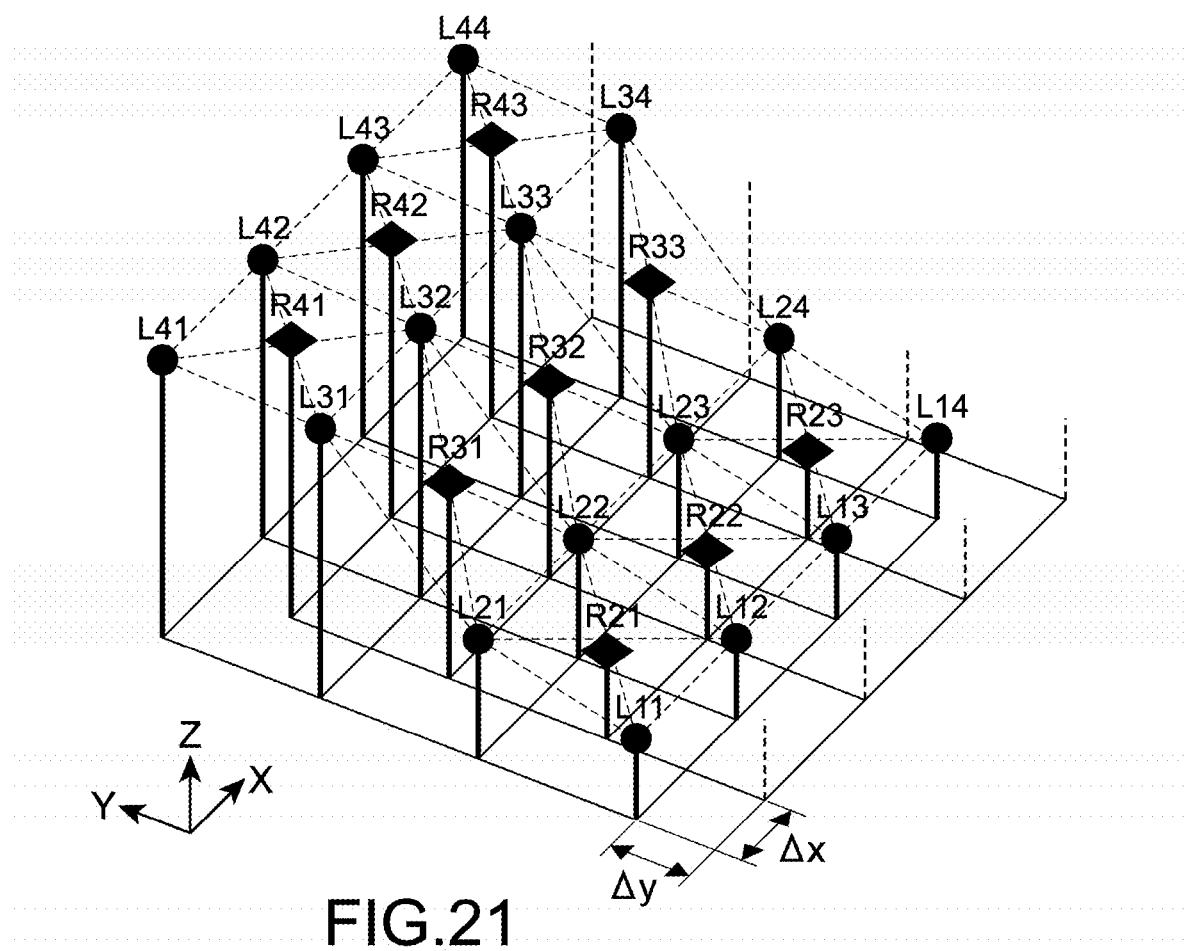
FIG. 21 is a diagram for describing a processing procedure for generating the second phase difference distribution according to the third embodiment.
Figure 22:
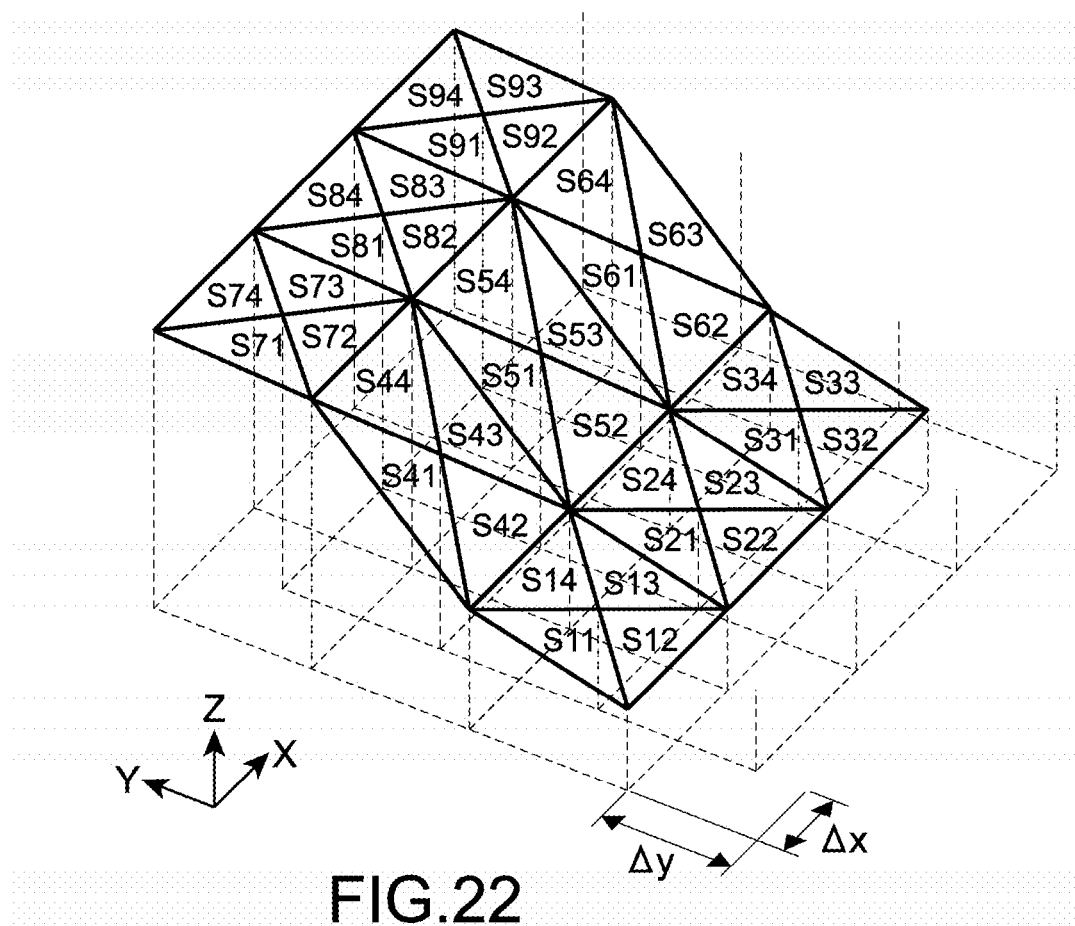
FIG. 22 is a diagram for describing a processing procedure for generating the second phase difference distribution according to the third embodiment.

When two parallax images coincide with each other at a sub-pixel level, the three-dimensional surface shape can be expected to be smoothly connected without irregularities. So, the three-dimensional surface shape smoothly connected only needs to be evaluated. With smoothness without irregularities, the surface area becomes the smallest, and thus the surface area of the three-dimensional surface shape only needs to be used as an evaluation function. FIGS. 21 and 22 show an example in the case where the matching at a sub-pixel level is obtained and the area becomes the smallest.

Here, an example of a method of obtaining the surface area by connecting the matching evaluation data on a three-dimensional space is shown. In the examples of FIGS. 19 to 22, triangles are formed according to a predetermined rule, e.g., an area of a triangle formed of the matching evaluation data L11, R21, and L21 is represented by S11, and an area of a triangle formed of the matching evaluation data L11, R21, and L12 is represented by S12. The areas of total 36 triangles from S11 to S94 may be determined to obtain the sum thereof.

Next, a method of determining an area of a triangle is shown. For example, assuming that the luminance values of the L11, the R21, and the L21 are $B_1$, $B_2$, and $B_3$, respectively, the length of a line segment connecting the L11 and the R21 is $D_1$, the length of a line segment connecting the R21 and the L21 is $D_2$, and the length of a line segment connecting the L21 and the L11 is $D_3$, $D_1$, $D_2$, and $D_3$ can be expressed by the following expressions.

$$D_1 = \sqrt{(\Delta x^2 + (1-\Delta y)^2 + (a(B_1-B_2))^2)}$$

$$D_2 = \sqrt{(\Delta x^2 + \Delta y^2 + (a(B_1-B_2))^2)}$$

$$D_3 = \sqrt{(1 + (a(B_1-B_2))^2)}$$

In those expressions, a coefficient a is used. The coefficient a is a parameter for converting a luminance into spatial distance information and affects the performance of the evaluation function. So, it is necessary to determine the value with a sufficient consideration so as to increase the performance of the evaluation function. Based on the lengths $D_1$, $D_2$, and $D_3$ of the line segments obtained in such a manner, the area S11 of the triangle is obtained using the Heron's formula.

$$S11 = \sqrt{(s(s-D_1)(s-D_2)(s-D_3))}$$

where $s=(D_1+D_2+D_3)/2$

The areas (S12 to S94) of the other triangles are obtained by a similar method.

As described above, the evaluation function $f(\Delta x, \Delta y)$ is as follows.

$$f(\Delta x, \Delta y) = S11+S12+S13+S14+S21+ \ldots +S84+S91+S92+S93+S94$$

As described above, the second phase difference distribution on a sub-pixel by sub-pixel basis is generated. In this embodiment as well, the same effects and actions as those of the first and second embodiments can be obtained. In particular, in this embodiment, since the areas of the predetermined triangles are used as the evaluation function, the correlation value can be obtained with a higher accuracy than the second embodiment in which the length of the predetermined broken line is used as the evaluation function.

Modified Example

Subsequently, a modified example of the third embodiment will be described.

In the third embodiment described above, the control unit 20 develops the imaging data D0 acquired by the imaging unit 10 and generates the second phase difference distribution on a sub-pixel by sub-pixel basis based on the plurality of developed parallax images. Instead of this, the matching processing may be performed with use of images before the development of the imaging data D0, that is, RAW images, to generate the second phase difference distribution.

In the case where the matching evaluation is performed with RAW data, color components may be separated from one another, a surface area of a solid acquired when luminance values of a plurality of pixels are connected may be obtained for each of the colors, and a combined value of the surface areas of the respective colors may be used as an evaluation function.

FIGS. 23 to 26 are diagrams showing an example of a matching evaluation of RAW images. In this example, an example in which four color pixels (RGGB) are disposed in one pixel will be described.

Figure 23:
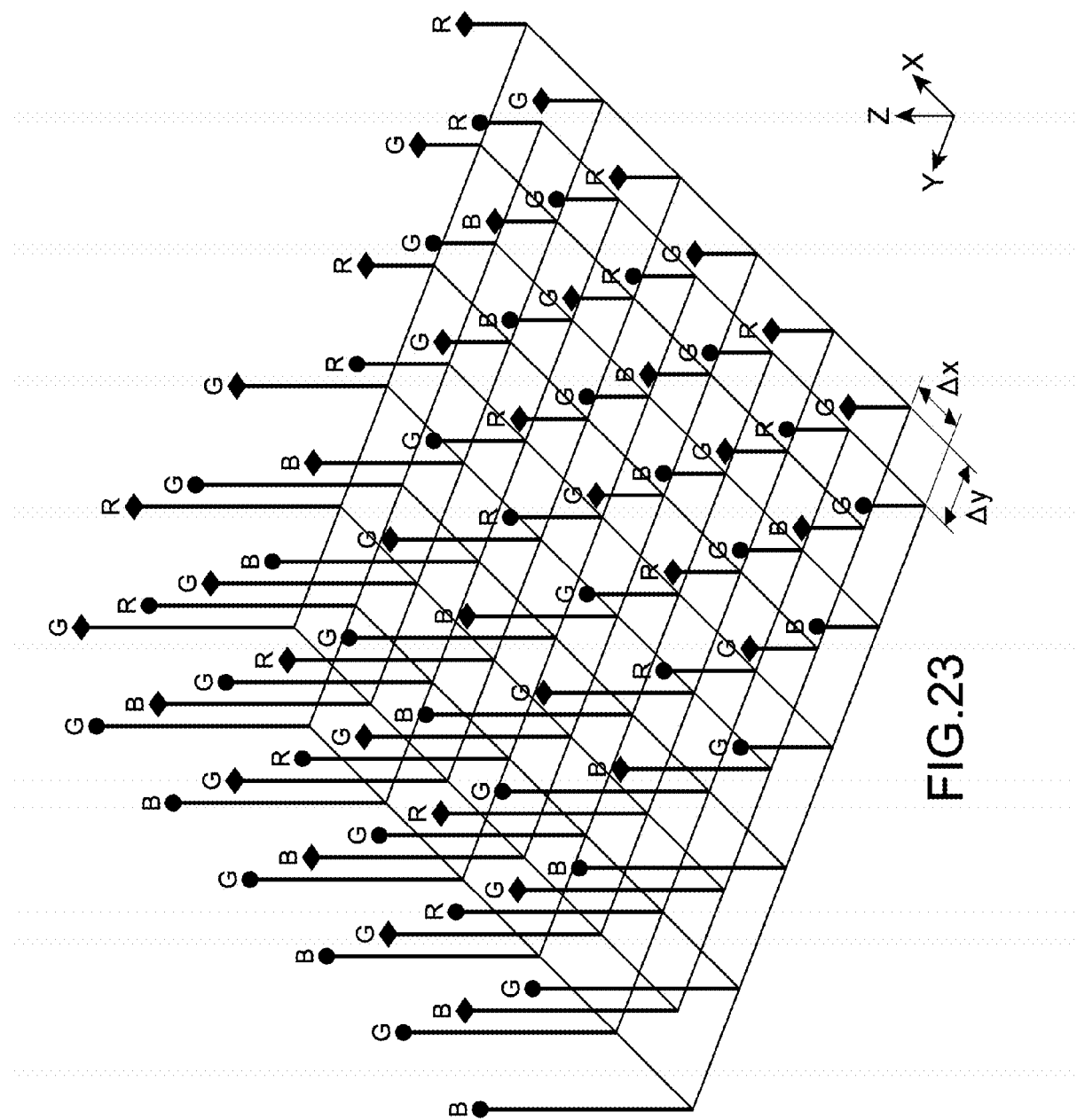
FIG. 23 is a diagram for describing a modified example of the processing procedure for generating the second phase difference distribution according to the third embodiment.
Figure 24:
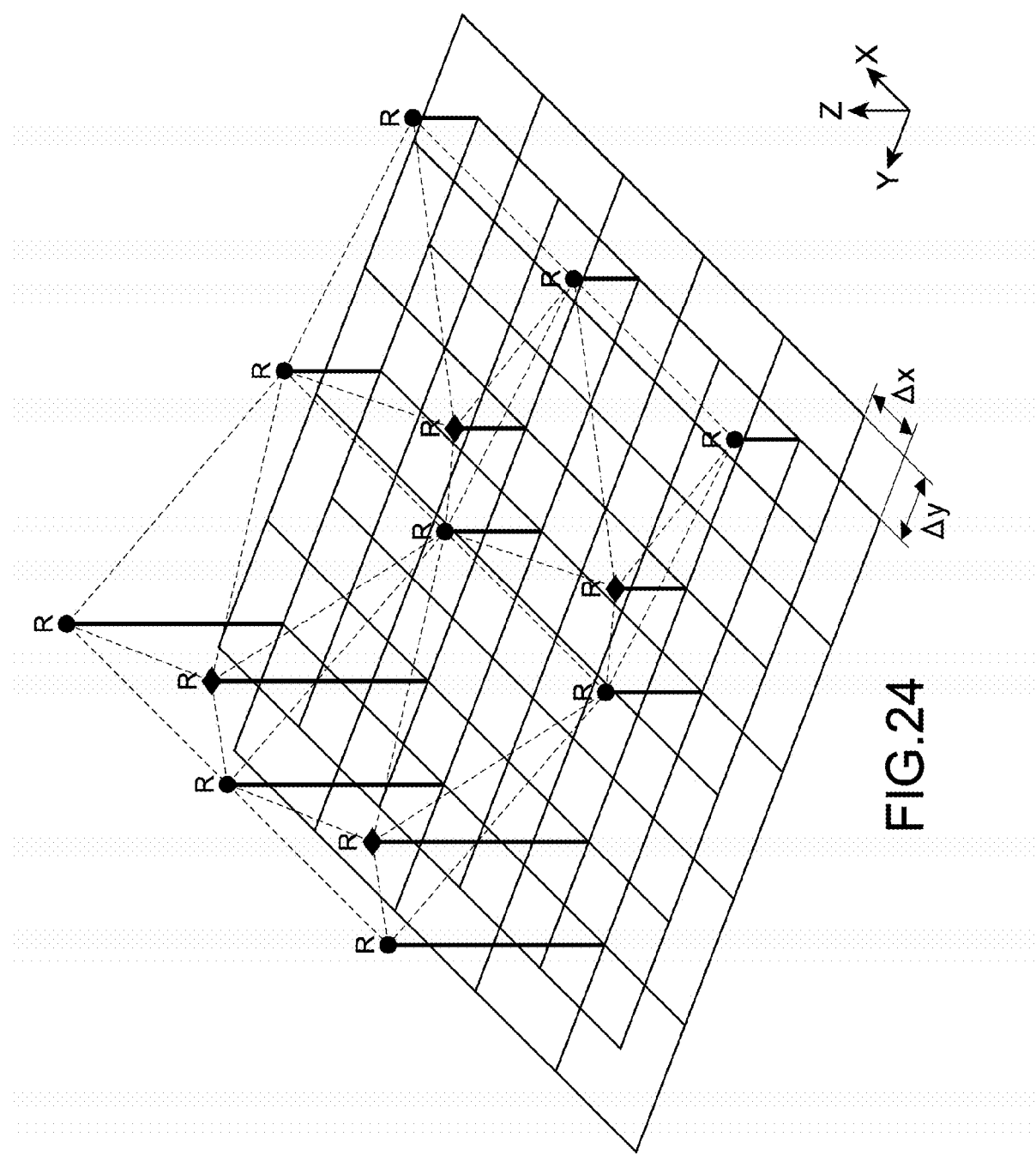
FIG. 24 is a diagram for describing the modified example of the processing procedure for generating the second phase difference distribution according to the third embodiment.
Figure 25:
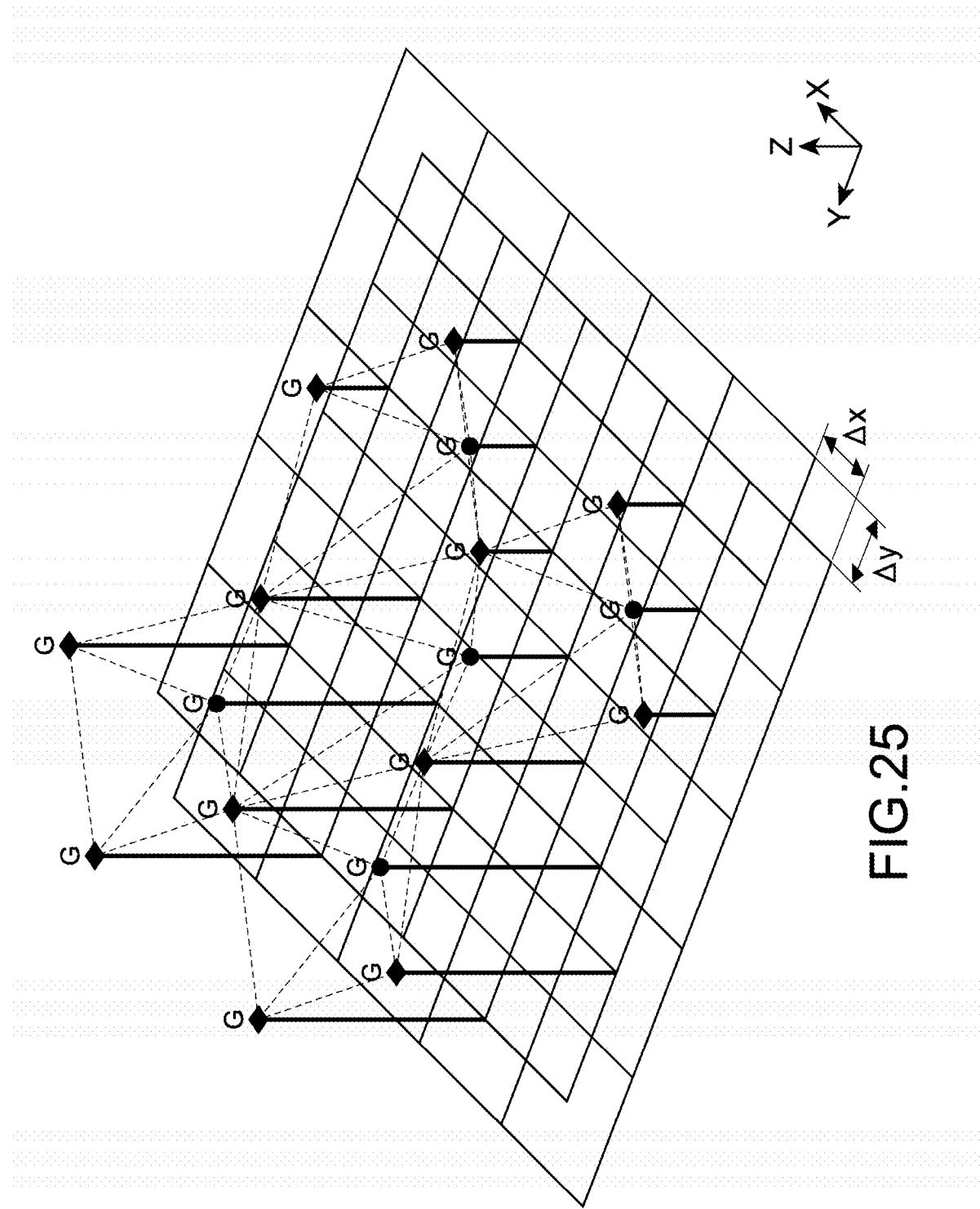
FIG. 25 is a diagram for describing the modified example of the processing procedure for generating the second phase difference distribution according to the third embodiment.

FIG. 23 shows data when pixel luminance values in respective colors in a pixel group of the left image and pixel luminance values in the respective colors in a pixel group of the right image are superimposed on each other on a pixel by pixel basis. For each of the colors, a correlation value of a luminance distribution between the images is calculated by a similar technique as described above. FIG. 24 shows an example of a three-dimensional surface formed of R pixels, FIG. 25 shows an example of a three-dimensional surface formed of G pixels, and FIG. 26 shows an example of a three-dimensional surface formed of B pixels.

Next, calculated are $\Delta x$, $\Delta y$, at which a combined value of an evaluation function $f_R(\Delta x, \Delta y)$ of the surface area of the three-dimensional surface formed of R pixels, an evaluation function $f_G(\Delta x, \Delta y)$ of the surface area of the three-dimensional surface formed of G pixels, and an evaluation function $f_B(\Delta x, \Delta y)$ of the surface area of the three-dimensional surface formed of B pixels becomes the smallest. The $\Delta x$, $\Delta y$ calculated as described above are generated as a second phase difference distribution of sub-pixels.

As described above, the embodiments of the present technology have been described, but the present technology is not limited to the embodiments described above and can be variously modified without departing from the gist of the present technology as a matter of course.

For example, in the embodiments described above, the imaging unit 10 including the two cameras 11 and 12 has been exemplified. However, an imaging apparatus having a structure in which a microlens array is disposed on a light-receiving surface of a single camera may be used as an imaging unit. Further, instead of the microlens array 12, an optical device capable of sorting light beams from a liquid crystal lens array, a liquid lens array, a diffraction lens array, and the like may be used.

Further, in the embodiments described above, the example in which the image processing unit is incorporated in the imaging apparatus has been described, but it is not limited thereto. The image processing unit may be formed of an information processing apparatus such as a PC (Personal Computer) terminal. In this case, image data in a plurality of viewpoints acquired by a multi-view camera is received in a wired or wireless manner, and thus the distance information of a measured object is calculated by the technique as described above.

Furthermore, in the third embodiment described above, the area of the predetermined triangle is used for the evaluation function. Instead of this, a volume of the triangle, a total area of a plurality of adjacent triangles, and the like may be used as the evaluation function.

It should be noted that the present technology can have the following configurations.

(1) An image processing apparatus, including
a parallax information generation unit to generate parallax information based on a first phase difference distribution and a second phase difference distribution, the first phase difference distribution being generated on a pixel by pixel basis for a first parallax image and a second parallax image, the second phase difference distribution being generated on a sub-pixel by sub-pixel basis based on the first phase difference distribution.

(2) The image processing apparatus according to (1), further including
a phase difference calculation unit to generate the second phase difference distribution based on the first phase difference distribution.

(3) The image processing apparatus according to (2), in which
the phase difference calculation unit generates the second phase difference distribution by correcting the first phase difference distribution with edge information detected from the first phase difference distribution.

(4) The image processing apparatus according to (3), in which
the phase difference calculation unit generates the second phase difference distribution by performing matching processing on a local luminance distribution of an edge portion calculated for the first parallax image and a local luminance distribution of an edge portion calculated for the second parallax image.

(5) The image processing apparatus according to (2), in which
the phase difference calculation unit generates the second phase difference distribution by calculating a correlation value between a luminance distribution in a first pixel group and a luminance distribution in a second pixel group, the first pixel group forming the first parallax image, the second pixel group forming the second parallax image and corresponding to the first pixel group.

(6) The image processing apparatus according to (5), in which
the phase difference calculation unit calculates the correlation value by using an evaluation function related to a luminance difference between a plurality of pixels adjacent to each other when the first pixel group and the second pixel group are superimposed on each other on a pixel by pixel basis.

(7) The image processing apparatus according to (6), in which
the phase difference calculation unit uses a length of a broken line as the evaluation function, the broken line being acquired when luminance values of the plurality of pixels are connected.

(8) The image processing apparatus according to (6), in which
the phase difference calculation unit uses a surface area of a predetermined three-dimensional surface as the evaluation function, the predetermined three-dimensional surface being acquired when luminance values of the plurality of pixels are connected.

(9) The image processing apparatus according to any one of (1) to (8), in which
the parallax information generation unit generates distance information of a measured object as the parallax information.

(10) The image processing apparatus according to (9), further including
a control unit to generate a refocused image by using the distance information generated by the parallax information generation unit.

(11) The image processing apparatus according to any one of (1) to (10), further including
an imaging unit to acquire a plurality of parallax images having different viewpoints.

(12) An image processing method, including:
acquiring a first parallax image and a second parallax image; and
generating parallax information based on a first phase difference distribution and a second phase difference distribution, the first phase difference distribution being generated on a pixel by pixel basis for the first parallax image and the second parallax image, the second phase difference distribution being generated on a sub-pixel by sub-pixel basis based on the first phase difference distribution.

DESCRIPTION OF SYMBOLS 1 imaging apparatus
2 subject (imaging target)
10 imaging unit
11, 12 camera
20 control unit
231 phase difference calculation unit
232 parallax information generation unit
EL, ER edge portion
PL left image
PR right image

The invention claimed is:
1. An image processing apparatus, comprising:
at least one processor configured to:
acquire a first parallax image and a second parallax image, wherein a viewpoint of the first parallax image is different from a viewpoint of the second parallax image;
generate a first phase difference distribution on a pixel by pixel basis based on a comparison of a first unit area of the first parallax image with a second unit area of the second parallax image;
generate a first luminance distribution of a first detection area in the first parallax image, wherein the first detection area comprises a first edge portion of the first parallax image;
generate a second luminance distribution of a second detection area in the second parallax image, wherein the second detection area comprises a second edge portion of the second parallax image;
determine a first edge angle of the first edge portion based on the first luminance distribution;
determine a second edge angle of the second edge portion based on the second luminance distribution;
determine a third luminance distribution for evaluation of the first parallax image based on the first edge angle;

determine a fourth luminance distribution for evaluation of the second parallax image based on the second edge angle;

determine a difference between first coordinates of a first pixel in the first detection area and second coordinates of a second pixel in the second detection area, based on the third luminance distribution and the fourth luminance distribution, wherein the first pixel and the second pixel have a same luminance, and wherein the difference between the first coordinates and the second coordinates corresponds to a phase difference on a sub-pixel by sub-pixel basis;

generate a second phase difference distribution based on the difference between the first coordinates and the second coordinates; and generate parallax information based on the first phase difference distribution and the second phase difference distribution.

2. The image processing apparatus according to claim 1, wherein the at least one processor is further configured to correct the first phase difference distribution based on edge information detected from the first phase difference distribution to generate the second phase difference distribution.

3. The image processing apparatus according to claim 1, wherein the at least one processor is further configured to calculate a correlation value between a fifth luminance distribution in a first pixel group and a sixth luminance distribution in a second pixel group to generate the second phase difference distribution, and wherein the first pixel group constitutes the first parallax image, and the second pixel group constitutes the second parallax image.

4. The image processing apparatus according to claim 3, wherein the at least one processor is further configured to calculate the correlation value based on a luminance difference between a third pixel of a plurality of pixels and a fourth pixel of the plurality of pixels, wherein the fourth pixel is consecutive to the third pixel, wherein the plurality of pixels comprise the first pixel group and the second pixel group, and wherein the first pixel group is superimposed on the second pixel group on the pixel by pixel basis.

5. The image processing apparatus according to claim 4, wherein the at least one processor is further configured to calculate the correlation value based on a length of a broken line, wherein the broken line connects luminance values of the plurality of pixels.

6. The image processing apparatus according to claim 4, wherein the at least one processor is further configured to calculate the correlation value based on a surface area of a three-dimensional surface, wherein the three-dimensional surface connects luminance values of the plurality of pixels.

7. The image processing apparatus according to claim 1, wherein the at least one processor is further configured to generate distance information as the parallax information, wherein the distance information indicates a distance between a measured object and an imaging unit.

8. The image processing apparatus according to claim 7, wherein the at least one processor is further configured to generate a refocused image based on the generated distance information.

9. The image processing apparatus according to claim 1, further comprising an imaging unit configured to acquire a plurality of parallax images, wherein the plurality of parallax images comprise the first parallax image and the second parallax image.

10. The image processing apparatus according to claim 1, wherein the sub-pixel is a pixel unit smaller than one pixel.

11. The image processing apparatus according to claim 1, wherein the at least one processor is further configured to:
measure a first luminance of each pixel of the first detection area in the first parallax image;
measure a second luminance of each pixel of the second detection area in the second parallax image;
generate the first luminance distribution based on the first luminance of each pixel of the first detection area; and
generate the second luminance distribution based on the second luminance of each pixel of the second detection area.

12. An image processing method, comprising:
acquiring a first parallax image and a second parallax image, wherein a viewpoint of the first parallax image is different from a viewpoint of the second parallax image;
generating a first phase difference distribution on a pixel by pixel basis based on a comparison of a first unit area of the first parallax image with a second unit area of the second parallax image;
generating a first luminance distribution of a first detection area in the first parallax image, wherein the first detection area comprises a first edge portion of the first parallax image;
generating a second luminance distribution of a second detection area in the second parallax image, wherein the second detection area comprises a second edge portion of the second parallax image;
determining a first edge angle of the first edge portion based on the first luminance distribution;
determining a second edge angle of the second edge portion based on the second luminance distribution;
determining a third luminance distribution for evaluation of the first parallax image based on the first edge angle;
determining a fourth luminance distribution for evaluation of the second parallax image based on the second edge angle;
determining a difference between first coordinates of a first pixel of the first detection area and second coordinates of a second pixel of the second detection area, based on the third luminance distribution and the fourth luminance distribution,
wherein the first pixel and the second pixel have a same luminance, and wherein the difference between the first coordinates and the second coordinates corresponds to a phase difference on a sub-pixel by sub-pixel basis;
generating a second phase difference distribution based on the difference between the first coordinates and the second coordinates; and
generating parallax information based on the first phase difference distribution and the second phase difference distribution.

* * * * *